US006901394B2

(12) United States Patent
Chauhan et al.

(10) Patent No.: US 6,901,394 B2
(45) Date of Patent: May 31, 2005

(54) METHOD AND SYSTEM FOR ENHANCED KNOWLEDGE MANAGEMENT

(75) Inventors: Digvijay S. Chauhan, Redmond, WA (US); Ramesh Parameswaran, Bellevue, WA (US); Stephen D. Eisner, Seattle, WA (US); Anthony B. Small, Seattle, WA (US)

(73) Assignee: AskMe Corporation, Bellevue, WA (US)

( * ) Notice: Subject to any disclaimer, the term of this patent is extended or adjusted under 35 U.S.C. 154(b) by 481 days.

(21) Appl. No.: 09/895,850

(22) Filed: Jun. 29, 2001

(65) Prior Publication Data

US 2003/0004909 A1 Jan. 2, 2003

Related U.S. Application Data

(60) Provisional application No. 60/215,590, filed on Jun. 30, 2000.

(51) Int. Cl.[7] .............................................. G06F 17/00
(52) U.S. Cl. .......................................... 706/60; 706/46
(58) Field of Search ...................................... 706/60, 46

(56) References Cited

U.S. PATENT DOCUMENTS

| | | | |
|---|---|---|---|
| 5,862,223 A | | 1/1999 | Walker et al. ................. 380/25 |
| 6,199,034 B1 | * | 3/2001 | Wical ............................ 704/9 |
| 6,270,456 B1 | * | 8/2001 | Iliff ............................ 600/300 |
| 6,363,384 B1 | * | 3/2002 | Cookmeyer et al. .......... 707/10 |
| 6,394,899 B1 | * | 5/2002 | Walker .......................... 463/9 |

OTHER PUBLICATIONS

How ExpertCentral Works, URL=http://www.expertcentral.com/how, download date Jun. 19, 2000.
How EXP Works, URL=http://www.exp.com/static_out/how_it_works.htm, download date Jun. 19, 2000.

* cited by examiner

Primary Examiner—George Davis
(74) Attorney, Agent, or Firm—Seed IP Law Group PLLC

(57) ABSTRACT

An enhanced knowledge management system ("KMS") is provided. The enhanced KMS provides a customizable, person-to-person, knowledge sharing portal that manages concurrent one-on-one conversations between requesters and expert resources. Through the knowledge sharing portal, the KMS provides the automatic capture, organization, and reuse of tacit knowledge, as well as integration with existing systems that manage already documented (explicit) knowledge. Example embodiments provide a Conversation Manager, which manages communication in the form of conversations (question and answer sequences) between users (requesters) and experts (expert resources), and allows system administrators to customize the system. Conversations are organized by subject matter categories and experts are ranked preferably by the system and by users, thereby increasing the likelihood of the KMS providing answers to users' questions. The Conversation Manager, in conjunction with managing these conversations, produces a dynamic knowledge base of knowledge that is searchable by other users. In this manner, the KMS enhances the ability in a multitude of environments to capture previously untapped knowledge and to integrate such knowledge with existing data.

23 Claims, 41 Drawing Sheets

| Log Out | Help | Home | Members Only | Experts Only |

Admin Console > Customize Application

Customize Application

Welcome, administrator
Your profile · Your favorites

Go to Administrator Page

Admin Console Home
Customize application
▸ General Preferences
  Graphics preferences
  Color preferences
  Customize points
Manage categories
Manage users
Manage security
View reports Contact AskMe Corporation
Customer Support

General Preferences

Company name: [AskMe] /2301

Name of this service: [AskMe Service] /2302
The service name appears in e-mail notifications sent out to members, e.g. "Welcome to the <Acme AskMe service>"

Name of home page: [Home] /2303
This text appears in the top horizontal bar and takes the user back to the home page of this service.

Tagline for this service: [Ask Real People] /2304
The tagline appears in e-mail notifications sent out to members, e.g. "Answers from real Experts!"

E-mail address for outbound notifications: [AutoNotify@askme.co] /2305
E-mail notifications to members are sent from the SMTP address specified above.

2306 — ☐ Display company logo on the sidebar.

2307 — ☐ Show link on every page, allowing users to contact administrators.

2308 — ☑ Rating system:
Click here to enable the star rating system.

2309 — ☑ Include disclaimer text:
Add disclaimer to the bottom of the page.

/2310
[Copyright 2000 AskMe Corp. All rights reserved..<br>Use of this site constitutes acceptance of]

2311 — ☑ Feature an expert's picture on the home page.
You can select experts based on the quantity and quality of answers given, and feature them on the home page.

2312 — ☑ Allow a user to easily ask a question directly from the home page.
If this is on, users can start asking questions directly from the home page and search will be moved to the left sidebar.
Example subjects: (comma separated)
[Communications or Data Transfer]
2313

2314 — ☑ Outlook integration - Allow users to install a utility which integrates Outlook with this service.
Integrate Outlook with this service. Users will be able to install the integration utility from the "Experts Only" page.

(Update) 2315

Click here to restore the original defaults.

| Log Out | Help | Home | Members Only | Experts Only |

Admin Console > Customize Points
Customize Points

Welcome, administrator
Your profile · Your favorites

Go to Administrator Page

Customize the Points System

Admin Console Home
Customize application
  General preferences
  Graphics preferences
  Color preferences
  Customize points
Manage categories
Manage users
Manage security
View reports

Contact AskMe Corporation
Customer Support

Points allow you to recognize people for their contributions to the . You can customize the number of points awarded to users and experts for the actions listed below. Note that all previously awarded points will be updated to reflect any changes made.

Points for asking questions
User rates an answer sent to him/her    [3] — 2701
User asks a question which is answered ·    [2] — 2702

Points for being an active expert
Xpert Sign Up (1st time, not per category:    [15] — 2703
Xpert answers a question sent to him/her.    [10] — 2704
Xpert answers a question on the QB.:    [3] — 2705

Points for quality of answers
These points are in addition to the points earned for answering questions.
Question is rated a 3 by the person who asked it.(Excluding QB): [3] — 2706
Question is rated a 4 by the person who asked it. (Excluding QB).[5] — 2707
Question is rated a 5 by the person who asked it. (Excluding QB) [7] — 2708
Questions is rated a 3 or above by anyone else.: [1] — 2709

Points for quick response
These points are in addition to the points earned for answering questions.
Xpert answers a question within 1 hour.:    [5] — 2710
Xpert answers a question within 24 hours..    [3] — 2711

2712 — ☑ Display Points and Ranking
Show users' points and ranking, and show all Top Ranked Experts lists

[Update] — 2713

Click here to restore the original defaults.
— 2714

METHOD AND SYSTEM FOR ENHANCED KNOWLEDGE MANAGEMENT

CROSS-REFERENCE TO RELATED APPLICATION

This application claims the benefit of U.S. Provisional Patent Application No. 60/215,590 filed on Jun. 30, 2000, which is incorporated herein by reference in its entirety.

BACKGROUND OF THE INVENTION

1. Field of the Invention

The present invention relates to a method and system for managing information, and, in particular, to methods and systems for providing an enhanced knowledge management system that integrates existing data with knowledge acquired through a knowledge management portal.

2. Description of the Related Art

Traditionally, knowledge pertaining to a specific environment or community is captured within a computer system environment and disseminated to persons seeking that knowledge using a variety of methods. Such knowledge typically occurs in two ways: explicit knowledge, which is knowledge that is documented in some way, and implicit or tacit knowledge, which is "knowledge in hiding," such as information that someone knows but hasn't yet shared. Existing knowledge management systems have focused on storing and disseminating explicit, or documented, knowledge. For example, a classic method for such knowledge capture and dissemination are documentation systems that allow the creation, storage, and display of documentation. For example, there are many computer-aided-information (CAI) systems that allow users to document existing applications, or manufacturing procedures, within a company (or other community). These systems typically gather the data and store it ahead of its use by new users to obtain information.

As another example, expert systems have focused on documenting knowledge by programming responses into a computer system that are variable based upon the sequence of questions received by a user. The responses (the knowledge), however, are preprogrammed into the system—therefore, before the system is used, the knowledge is documented. Also, such systems are typically limited to information within a specific (albeit sometimes large) subject area, such as a medical expert system. There is no method, therefore, in these systems to capture new knowledge that is potentially unrelated to prior documented knowledge.

SUMMARY OF THE INVENTION

Embodiments of the present invention provide computer-based methods and systems for creating an enhanced knowledge management system (a "KMS"). The enhanced KMS provides a customizable, person-to-person, knowledge sharing portal that manages concurrent one-on-one conversations between requesters and expert resources. Each conversation comprises knowledge that is captured by the KMS into a knowledge base that is searchable by others, including users other than those registered with the system. Conversations can be designated "anonymous" in the sense that the identity of the requester isn't displayed to the expert resources; and conversations can be designated "private" in the sense that the conversation is not displayed (or searchable) by individuals other than the conversation participants.

Example embodiments of the enhanced KMS provide a Conversation Manager (the "CM"), which manages communication between users (requesters) and experts (expert resources), and allows system administrators to customize the system. Using the CM, registered users pose queries to registered experts, which are subsequently answered (when answers are available) by these experts. These conversations are automatically indexed and stored in the knowledge base so that they are accessible by persons other than the original requestor. In some embodiments, answers to questions are rated, and the questions are organized by customizable categories and subcategories to enhance the likelihood of a user receiving a sufficient answer to a posed question.

In one embodiment, the enhanced KMS integrates existing databases with knowledge that is captured by the ongoing conversations managed by the CM to create an extensive knowledge base of previously known information and captured information. The KMS provides a set of integration interface tools that can be used to communicate with data that is stored in an external database. The distributed nature and location of the data is transparent to the requester. In one embodiment, the data is prevented from being stored in duplicate.

In another embodiment, the questions are targeted to specific categories. In some cases the KMS determines the category that corresponds to a question that has been input by a requester. In one embodiment, the KMS determines the category based upon the subject text of the question. In other cases, the requestor designates an expert that is associated with the category that corresponds to the question. In yet other cases, the requester designates an expert that is automatically thereafter associated with the category of the question posed.

In yet another embodiment, the expert resources are dynamically ranked. An expert resource is dynamically assigned a rank based upon one or more of the following: previous ratings, number of pending requests; number of previously submitted responses; and response time. A user may then target a question to an expert resource that is determined to be the "best" in the situation using the dynamic expert rank. In some embodiments, requesters rate received answers. In other embodiments, viewers of the knowledge base other than requester rate the answers.

In one embodiment, an expert may be "muted" by a user so that a user's question cannot be answered by the muted expert. In another embodiment, a user may be "muted" by an expert so as not to receive questions from the muted user.

In yet another embodiment, questions are posed to a Question Board. In some embodiments, there is a Question Board associated with each question topic (category or other grouping). Preferably, one or more experts that are associated with that question topic are selected by the CM to answer a question posed to the associated Question Board. In some embodiments, the user selects an expert from the experts associated with that question topic; in other embodiments, the CM selects an expert automatically based upon the associations and ratings of the experts. In some embodiments, questions on a Question Board expire according to an expiration condition.

BRIEF DESCRIPTION OF THE DRAWINGS

FIG. 5 is an example screen display of a New User component of the User Console, which is used by the CM to register a new user.

FIG. 7 is an example screen display of an Expertise Definition portion of the New Expert component of the CM User Console.

FIG. 8 is an example screen display of a Create Account portion of the New Expert component of the CM User Console.

FIG. 9 is an example screen display of an Initiate Session component of the CM User Console.

FIG. 10 is an example screen display of a Browse Subcategories component of the CM User Console.

FIG. 13 is the bottom section of an example screen display showing a Browse Experts component of the CM User Console.

FIG. 16 is an example screen display of a Question Details component of the CM User Console.

FIG. 20 is the top section of an example screen display of an Answer Details component of the CM User Console.

FIG. 21 is the bottom section of an example screen display of an Answer Details component of the CM User Console.

FIG. 23 is an example screen display of a General Preferences component of the CM Administrative Console.

FIG. 26 is an example screen display of a Main Colors portion of the Color Preferences component of the CM Administrative Console.

FIG. 27 is an example screen display of a Customize Points component of the CM Administrative Console.

FIG. 29 is an example screen display of an Add/Edit Category portion of the Manage Categories component of the CM Administrative Console.

FIG. 32 is an example screen display of a Select Users portion of the Manage Users component of the CM Administrative Console.

DETAILED DESCRIPTION OF THE INVENTION

Figure 1:
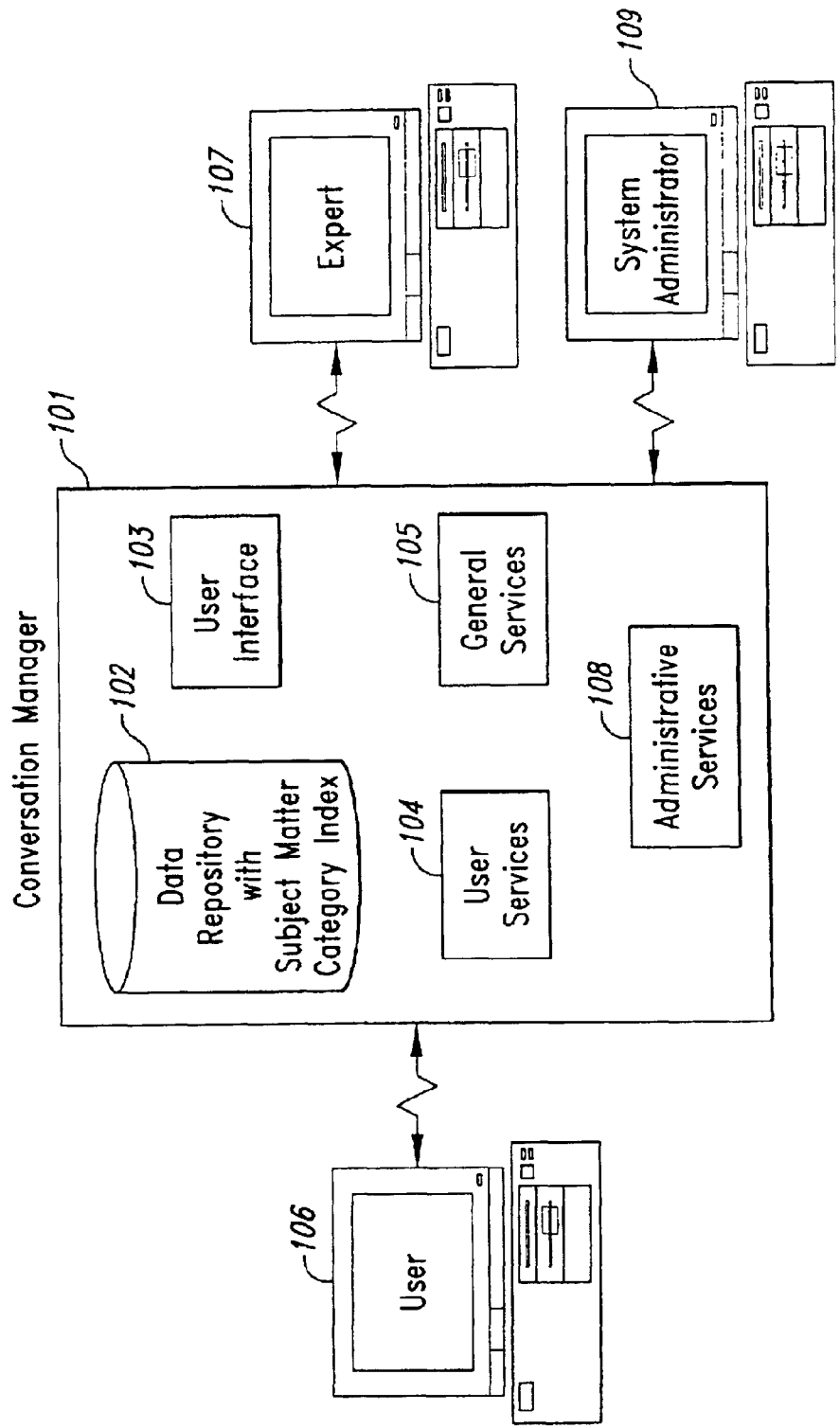
FIG. 1 is an example block diagram of an exemplary embodiment of the Conversation Manager of the present invention.

Embodiments of the present invention provide computer-based methods and systems for a creating an enhanced knowledge management system (a "KMS"). The enhanced KMS provides a customizable, person-to-person, knowledge sharing portal that manages concurrent one-on-one conversations between requestors and expert resources. The KMS provides the automatic capture, organization, and effective reuse of knowledge, especially tacit knowledge, as well as integration with existing systems that manage already documented (explicit) knowledge. The result is a dynamic knowledge base that can be easily searched and reused by a multitude of individuals within a designated community. For example, embodiments of the enhanced KMS can be used in a corporate environment to integrate corporate databases of existing information, such as employment data and manufacturing processes, with new information that is captured by the enhanced KMS during the knowledge acquisition process.

Example embodiments of the enhanced KMS provide a Conversation Manager (the "CM"), which manages communication between users (requesters) and experts (expert resources), and allows system administrators to customize the system. Knowledge is "learned" (captured) by the enhanced KMS through conversations between users and experts. For the purpose of this application, a conversation is an exchange of information between a user and an expert. This exchange can be as small as a single user-submitted question, or can be more lengthy, for example, several exchanges between a user and an expert that result from a single user-submitted question. Using the CM, registered users pose queries to registered experts, which are subsequently answered (when answers are available) by these experts. For example, within a corporate environment, a user may submit a question to an expert in the "Employee Benefits" subject matter category that asks when the open enrollment period is for the company sponsored health insurance plan. An appropriate expert is then able to respond to the question, giving the dates for open enrollment. Queries can be submitted on an individual basis to specific experts, to one or more experts designated by the CM or the user, or to a publicly viewable Question Board, where queries are answered by experts in the subject matter category that corresponds to that Question Board. The CM manages the flow of each conversation and stores each conversation so that the knowledge inherent in that conversation can be later retrieved by the initial requester, or optionally by others. In this manner, the CM captures the tacit knowledge that resides with these experts, so that it can be efficiently disseminated to and reused by others.

Conversations that are stored within the system are organized according to a Subject Matter Category Index. Subject matter categories represent any kind of groups or divisions of conversations, hence knowledge. For example, categories such as Agriculture, Astronomy, Botany, Biology, Energy, Medicine, Sports, Recreation, Parenting, etc., may be used to organize conversations in a general-purpose knowledge sharing environment. In a corporate environment, categories may be used to represent meaningful divisions within the company, such as business units, functional roles, products, or cross-functional projects. One skilled in the art will recognize that the subject matter categories could be any kind of grouping and use any means for providing a way to organize and manage homogeneous or heterogeneous information.

FIG. 1 is an example block diagram of an exemplary embodiment of the Conversation Manager of the present invention. The CM 101 facilitates conversations between each user 106 and each expert 107, and provides each system administrator 109 with the ability to customize the system. The CM comprises several user interface components 103, a data repository with Subject Matter Category Index 102, user services component 104, general services component 105, and administrative services component 108. The data repository 102 is used to store data associated with each system administrator, each registered user, each registered expert, the Subject Matter Category Index, and all conversations. The general services component 105 provides routines that are available to all users of the system, registered or not, such as registering new users and experts. The user services component 104 provides routines that are available only to registered users and/or registered experts, such as initiating and responding to queries. The administrative services component 108 provides routines that are available only to system administrators, such as creating new categories.

Figure 2:
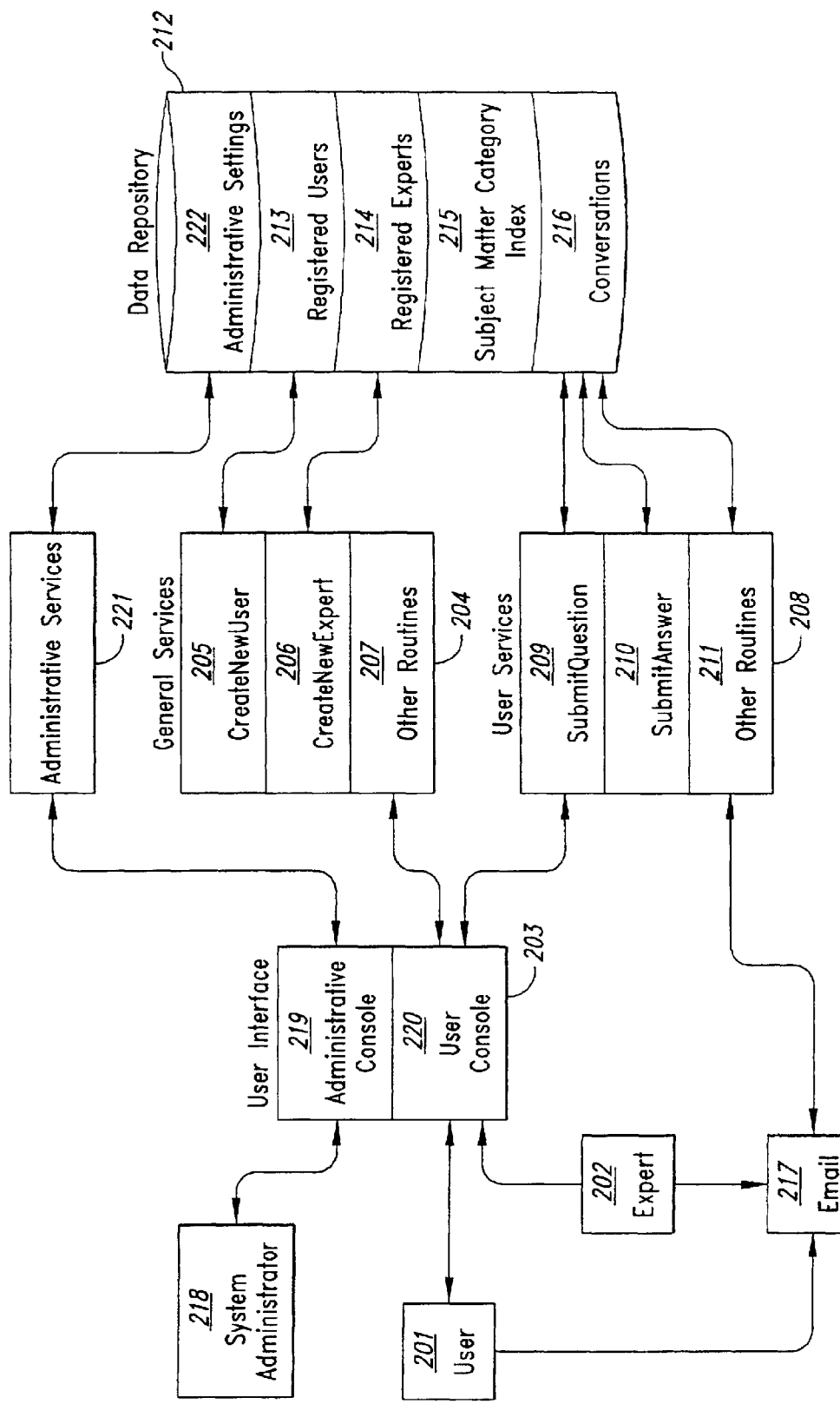
FIG. 2 is an example block diagram of example data flow between the components of the Conversation Manager, system administrators, users, and experts as used to practice enhanced knowledge management.

FIG. 2 is an example block diagram of example data flow between the components of the Conversation Manager, system administrators, users, and experts as used to practice enhanced knowledge management. In particular, system administrators interact with the components of the CM to customize the system; users and experts interact with the components of the CM to register and to participate in conversations. When an individual registers with the system to become a user, the user 201 submits registration data through the User Console portion 220 of the user interface 203. The User Console 220 then invokes the CreateNewUser routine 205 of the general services component 204 to submit the data to the Registered Users segment 213 of the data repository 212. When an individual or other expert resource registers with the system to become an expert, the expert 202 (or the system on behalf thereof) submits registration data through the User Console portion 220 of the user interface 203. The User Console 220 then invokes the CreateNewExpert routine 206 of the general services component 204 to submit the data to the Registered Experts segment 214 of the data repository 212.

The CM allows individuals to register as experts in one or more subject matter categories. Registering in a particular category allows the expert to answer questions that are submitted in that category. One skilled in the art will recognize that expert resources other than human beings may also be registered with the system, including previously stored information, or other computerized means that can be used to respond to a user's query. For example, an external expert system may be registered with the CM as an expert.

The CM allows users to register with the system to ask questions of (submit requests to) one or more registered experts. Non-registered system users may view the information stored in the knowledge management system, but are prevented by the CM from submitting questions.

Once the users and experts have been registered with the CM, conversations between those users and experts can take place. A user 201 submits a question to the CM through the User Console portion 220 of the user interface 203. The User Console 220 then invokes the SubmitQuestion routine 209 of the user services component 208. The SubmitQuestion routine 209 then stores the question in the Conversations Segment 216 of the data repository 212. The SubmitQuestion routine 209 also determines the appropriate expert(s) to notify, if any, depending on the question submission method chosen by the user (discussed further below). If the user has identified one or more specific experts when submitting the question, the SubmitQuestion routine 209 distributes notification of the question to the designated experts 202 through the user interface 203 and through email 217. If the user chooses instead to post the question to a Question Board for the selected subject matter category, then the SubmitQuestion routine 209 distributes notification of the question only to those experts within the designated subject matter category who previously indicated during their registration processes that they wish to be notified of new Question Board questions. If the user chose instead to allow the system to determine the best experts to respond to the question, then the SubmitQuestion routine 209 distributes notification of the question to the top three experts who registered within the designated subject matter category, according to expert rank. One skilled in the art will recognize that the number of experts selected by the CM is modifiable, and any number of experts registered within the designated subject matter category could be designated.

The CM provides access to the participants of each conversation through the CM user interface. The full content of each conversation is stored by the CM and is not distributed outside of the system. When a user or expert initiates a session with the enhanced KMS, the CM displays through the user interface 203 a notification if the user/expert has received a new answer or question that has not yet been viewed. Users and experts may also choose to have the CM notify them, by one or more alternate means of communication, when a new question or answer that is directed to that user or expert has been received. In one embodiment, the CM provides external notification in the form of an email message. One skilled in the art will recognize that alternate forms of notification may also be used, including notification by telephone, pager, flashing icon on the desktop, or by any other similar means for notification.

Once the appropriate experts have been notified, the CM considers the question pending until an expert submits an answer to that specific question. An expert 202 submits an answer to the CM through the User Console portion 220 of the user interface 203. The User Console 220 then invokes the SubmitAnswer routine 210 of the user services component 208. The SubmitAnswer routine 210 then stores and associates the answer with the appropriate question in the Conversations segment 216 of the data repository 212 and distributes notification of the answer to the appropriate user through the user interface 203 and email 217.

System administrators also interact with the components of the CM to customize the enhanced knowledge management system. Specifically, system administrators submit data through the Administrative Console portion 219 of the user interface 203. The Administrative Console 219 invokes various routines in the administrative services components 221 to customize and manage the system. For example, graphics that are displayed throughout the user interface, text and background colors, incentives for users and experts to participate in the KMS, and subject matter categories may all be customized. System administrators are also able to manage user settings (e.g., which users have administrator privileges). Any data that corresponds to administrative settings are stored in the Administrative Settings segment 222 of the data repository 212.

The system administrator also may use routines in the administrative services component 221 to integrate into the KMS existing information. In a preferred embodiment, the CM contains an integration interface, for example, a Lightweight Directory Access Protocol (LDAP) interface, which provides for the CM data repository to be distributed, with at least a portion of the data residing in another data repository. For example, when installing the system within a corporate environment, the company may have an existing data repository containing an employee directory. The integration interface can be used to establish communication and share data between the CM data repository and the existing company data repository, by, for example, automatically registering all company employees as users within the CM. Data required by the CM that is not available in the current employee directory is stored in the CM data repository, while data that is common between the two systems preferably remains in the existing company data repository. The integration interface can thus reduce the complexity of maintaining the data repository by eliminating duplicate data storage. In addition, it enables existing data to be easily incorporated into the enhanced knowledge management system by providing access to the native data directly.

Access to the knowledge base is carefully controlled by the CM and can be customized by the system administrator through the administrative services component. In particular, conversations by default are preferably public, but can also be designated as "anonymous" or "private." Specifically, when a user registers with the system, the user chooses or is assigned a unique username and password, which allows the user to submit questions to the CM. The CM uses the username to identify the user who submits each question. Preferably, by default, any time a submitted question is displayed within the system, the username of the user who asked the question is also displayed. However, the user may chose otherwise. Specifically, the user may submit a question and mark it "Anonymous;" or "Private." When the user marks a question as "Anonymous," the user's username is still stored with the question within the system for tracking purposes, but the username is never displayed with the question. This feature is useful when a user wants to ask a question on a potentially sensitive subject and doesn't want to be identified in connection with the question. For example, an employee in a corporate environment may have a question regarding how to file a sexual harassment complaint against the user's supervisor, but doesn't want the user's name to ever be publicly associated with the question. When the user marks a question as "Private," the conversation is stored within the system, but never displayed to anyone other than the conversation participants. This feature allows users and experts to communicate through the system about sensitive subjects without those conversations ever being visible to anyone other than the conversation participants. Users may use the Private and Anonymous marking features independently or in combination.

All conversations, except those marked "Private" are displayable and searchable by anyone within the system. Any system user, registered or not, may browse or search previous non-Private conversations. This feature provides wide distribution of knowledge within a designated community and allows users to often find desired information without having to submit a question or register with the system.

In addition to controlling access to the knowledge base, the CM provides for the efficient capturing of new knowledge through its answer rating and expert ranking system. All users of the enhanced knowledge management system have the ability to rate answers that are submitted by the experts (whether or not they asked the question). When a user receives an answer to a question that the user submitted, the user can thereafter submit a rating (for example, based on a scale of 1 to 5) of the answer, indicating the usefulness of the answer received. Other system users who are browsing previous conversations may also submit ratings of answers to questions that were submitted by other users to indicate the usefulness of the answer. When a rating of an answer is submitted, the CM associates the rating with the appropriate answer and the expert who submitted the answer. In one embodiment, these ratings are combined into a single rating; however, one skilled in the art will recognize that variations for tracking and displaying multiple ratings of a single answer or group of answers are contemplated and within the scope of the invention. These ratings are then preferably used by the CM to determine the "best" expert to answer a submitted question in a particular subject matter category, thereby increasing the efficiency of the system by increasing the likelihood of receiving a "good" answer.

Specifically, experts within the system are organized according to the Subject Matter Category Index. When the experts associated with a subject matter category are displayed, they are typically ordered by an expert rank. Specifically, each expert is assigned a dynamic expert rank, which preferably is calculated based on one or more of the following factors: (1) the expert's average response time to previous questions; (2) the number of current requests directed to the expert that are still pending a response; (3) the number of answers previously submitted by the expert; and (4) previous answer ratings (from the user asking the question or from other users browsing the system). The expert rank is designed to aid the CM in presenting to the user an ordered list of experts, with the expert most likely to provide a quality response being presented in a prominent position, for example, at the top of the list. Incorporating the expert's average response time to previous questions in the calculation of the expert rank ensures that experts who repeatedly respond quickly will be near the top of the list. Incorporating the number of current requests pending response ensures that the least busy experts will be near the top of the list. Incorporating the number of previous responses ensures that experts who frequently respond will be near the top of the list. Finally, incorporating the ratings of previous answers ensures that experts who have repeatedly submitted answers that users found most useful will be near the top of the list. One skilled in the art will recognize that there are many ways to calculate an expert rank, including the use of weighting values to place more or less importance on each factor to the overall calculation and including the incorporation of factors other than those listed above.

To enhance the flexibility and extensibility of the system, the CM provides for dynamic profiling of experts. Dynamic profiling provides "on-the-fly" modification of an expert's profile. When an individual registers as an expert, the CM creates an expert profile for that expert. The expert profile contains the information necessary to associate the expert with particular subject matter categories and also stores expert-submitted data that describes the expert's expertise. The expert-submitted data may include, for example, a textual description of the expert's expertise and a set of keywords associated with the expertise, for use by the CM to quickly find a particular "best-fit" expert. When an expert answers a question in a subject matter category that doesn't specifically relate to areas in which the expert has previously declared an expertise, the CM automatically updates the expert's profile to include a new area (typically a subcategory) of expertise. This behavior is referred to as "dynamic profiling." The CM performs dynamic profiling to better identify, based over time and experience of the system, which experts should be associated with each subject matter category. For example, assume that the KMS has a subject matter category called "Automotive Repair," which has a subcategory called "Electrical Repairs."

Further assume that an expert has designated him/herself as an expert in the "Automotive Repair" subject matter category. If the expert answers questions in the "Automotive Repair" subject matter category that are specifically related to the "Electrical Repairs" subcategory (based upon keywords in the answers), the CM will add new keywords to that expert's profile (the information describing an expert's expertise), and further associate the expert with the "Electrical Repairs" subcategory, as well as the "Automotive Repair" category. Through dynamic profiling, a user's ability to locate the experts who are most qualified to answer the user's questions is enhanced.

The CM also provides a variety of means for initiating conversations between user and expert participants. Preferably, the user chooses a means for conversation when submitting a question. The first method relies on specific selections by the user and provides the greatest user control. Specifically, the CM displays a list of (configurable) stored subject matter categories, and allows the user to designate the most appropriate category for the user's question. Based on the designated category, the CM displays the list of experts registered within the selected category, preferably ordered by expert rank, and allows the user to designate one or more specific experts to which to submit the question. The user then submits the question to the CM, which, in turn, notifies the selected experts of the new question, and provides the selected experts access to the question.

The second method uses the Question Board. Each subject matter category has an associated Question Board, which is a designated area of the KMS to which questions can be posted. Specifically, the CM displays the subject matter categories, allowing the user to select the most appropriate category for the user's question. Next, the user submits the question to the CM, which stores the question as part of the Question Board associated with the selected subject matter category. These questions are then available to be answered by any experts who are registered within the selected subject matter category (and its subcategories). Use of the Question Board saves time that would be otherwise required to review and select one or more specific experts, and allows users to submit questions in a subject matter category even if the user has difficulty identifying an expert who appears qualified to answer the question.

The third method of submitting a question uses the CM to automatically determine as much information as possible. Specifically, the user first submits a textual description of the subject of the question to be posted. The CM first performs a keyword search to determine the most appropriate subject matter category that corresponds to the user's question. The CM then gives the user an option to continue to use the system determined category or an option to select a different category if the user doesn't find that the system selected the most appropriate category. Next, the user submits the question to the CM. In one embodiment of the invention, the CM posts the submitted question to the Question Board for the determined subject matter category. In another embodiment of the invention, the CM selects the top "n" experts (for example, the top three experts) associated with the determined subject matter category, as ordered by expert rank, notifies the determined experts of the new question, and provides the determined experts access to the question. One skilled in the art will recognize that other combinations of determining which experts to direct the questions to in this automated mode are also contemplated.

The CM provides a variety of mechanisms for customizing the system. Specifically, a user can customize his or her personal view of the system by selecting specific subject matter categories and/or experts of particular interest. These selections are stored within the system (for example, as "favorites") and made accessible to the user when initiating a session with the enhanced KMS. With this customization feature, users are able to have quick access to frequently used experts and categories without having to browse through the displayed subject matter categories or associated experts.

The CM also allows customization to be performed by individuals designated within the system as system administrators. In one embodiment, there are two levels of system administrators supported by the system: Super Administrators ("SA") and Category Administrators ("CA"). Each SA can customize any portion of the system, for example, specific site features that can be toggled on or off, such as graphical and text elements; Subject Matter Category Index creation, maintenance, and properties; user management, including administrative and site privileges; and site security settings. Each CA is associated with one or more specific subject matter categories, and can customize portions of the system within the subject matter categories with which they are associated. The category specific features that can be customized include, for example, creating new categories, editing existing categories, and setting category properties.

Experts may also customize the system by opting to maintain a Frequently Asked Questions (FAQ) list for each subject matter category in which he or she is registered as an expert. Experts choose which conversations to include in the FAQ list, and can refer to this list when answering user-submitted questions and send an indication to an already existing answer. This feature saves the expert time, allowing the expert to re-use answers to questions that are frequently submitted and/or require lengthy answers.

Another aspect of customizability involves the ability for both users and experts to "mute" one another. If an expert mutes a user, the CM prevents the user from submitting questions to that expert. Alternatively, if a user mutes an expert, the CM prevents the expert from submitting answers to any questions submitted by that user (by, for example, excluding the expert as one of the experts that is able to be selected by the user). The "mute" feature allows users and experts to avoid dealing with communication from hostile or uninformative experts or users. For example, if a user submits a question to an expert that the expert finds offensive (for example, perhaps the question content is deemed discriminatory by the expert), the expert can decline to answer the question, and mute the user. This will prevent the user from being able to submit additional questions to this particular expert. If the user tries to submit a question to this expert after the user has been muted, the CM will present the user with a message indicating that the expert is unavailable to answer questions at the current time. Similarly, if a user submits a question and receives an objectionable answer from an expert, the user may choose to mute the expert, preventing the expert from answering any further questions submitted by the user. This act also preferably prevents the muted expert from being able to respond to questions posted on a Question Board by the user who muted the expert. One skilled in the art will recognize the users and experts can also be muted on a per category basis, as well as by other groupings.

Figure 3:
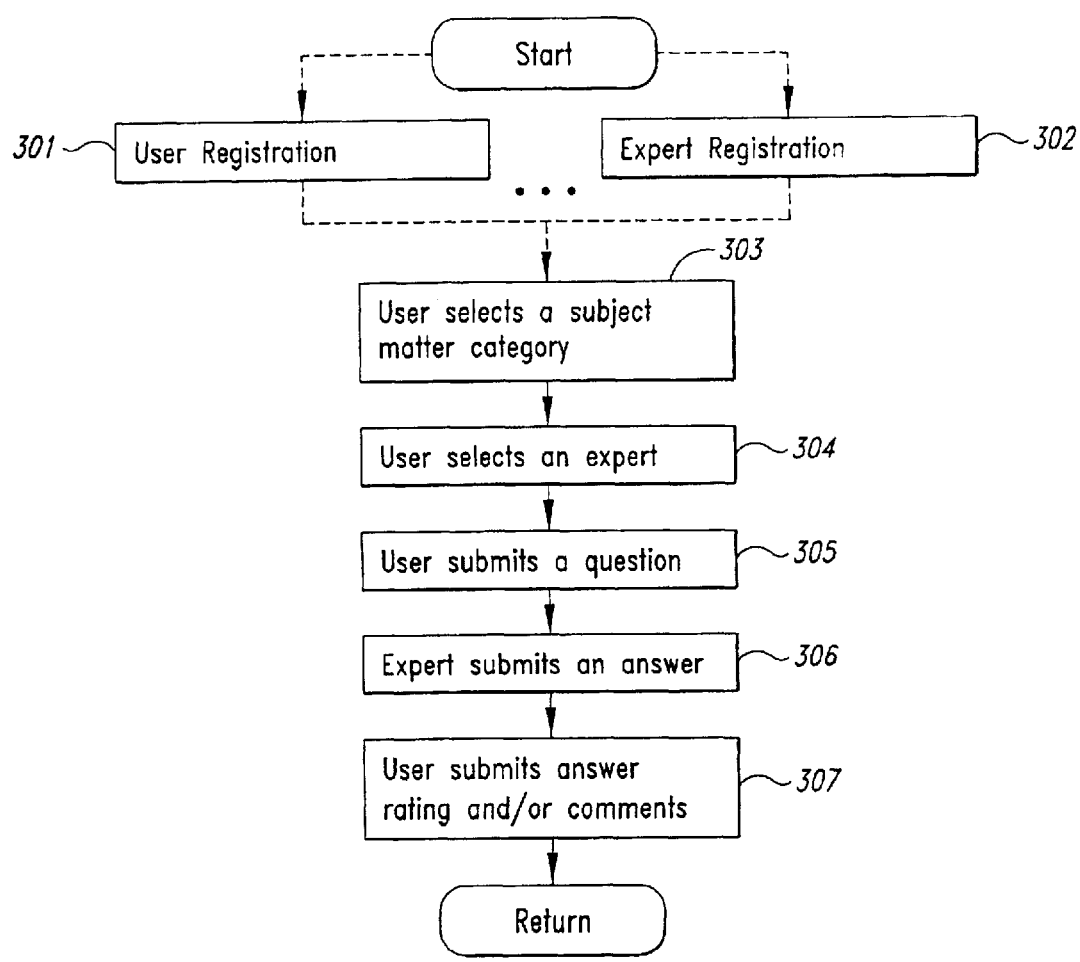
FIG. 3 is an example flow diagram of a sample conversation between a user and an expert in the enhanced knowledge management system.

FIG. 3 is an example flow diagram of a sample conversation between a user and an expert in the enhanced knowledge management system. Steps 301 through 307 demonstrate how a user and an expert interact with the CM to participate in a conversation using the first method for submission of a question, where the user directly selects an expert to answer the question. Specifically, in step 301, the user registers with the system, submitting data to be stored in the Registered Users segment 213 of the data repository 212. In step 302, the expert registers with the system, submitting data to be stored in the Registered Experts segment 214 of the data repository 212. The user registration and expert registration steps (301 and 302) are preferably necessary only prior to the first conversation participated in by the user and expert, respectively, and may occur in any sequence or at any time. Participation in additional conversations by either the user or the expert preferably does not require registration. In step 303, the user selects a subject matter category from the Subject Matter Category Index 215, which is displayed by the CM through the user interface 203. The Subject Matter Category Index may be a stored hierarchical structure of subject matter categories and subcategories. One skilled in the art will recognize that there are many ways in which the subject matter categories may be indexed. After the user has selected a subject matter category, the CM displays the list of experts associated with the designated subject matter category, ordered by expert rank (not shown). In step 304, the user selects an expert from the displayed list of experts. In step 305, the user submits a question to the CM. The CM stores the question in the Conversations segment 216 of the data repository 212, and notifies the designated expert of the question (not shown). In step 306, at some potentially later point in time, the expert submits to the CM an answer to the question. The CM stores and associates the answer with the question in the Conversations segment 216 of the data repository 212, and notifies the user of the answer (not shown). In an alternate embodiment of the invention, the CM provides the expert with the option of submitting a request for clarification from the user prior to answering the question. In step 307, the user optionally rates the answer received, indicating the level of the user's satisfaction with the answer. This rating is stored with the answer in the Conversations segment 216 of the data repository 212 (not shown). The CM may also combine the rating with previous ratings associated with the responding expert and store the combined rating in the Registered Experts segment 214 of the data repository 212. In step 307, the user also has the option of submitting comments on the received answer or asking a follow-up question directed back to the responding expert.

The steps of FIG. 3 are modified slightly to account for aspects of the other mechanisms of question submission. Specifically, when the second question submission mechanism is used, step 304 (the user selecting the expert) is eliminated. Using this mechanism, the question submitted by the user in step 305 is posted to the Question Board in the subject matter category that was selected by the user in step 303. Any number of experts registered within the selected category may then submit an answer as indicated in step 306. When the third question submission mechanism is used, steps 303 and 304 (selection of subject matter category and expert) are replaced by a step in which the user submits text defining the subject of the question the user wishes to submit. The CM then selects the most appropriate subject matter category by performing a keyword search comparing the user-submitted subject with the stored subject matter categories. Next, in step 305, the user submits a question. In one embodiment, the CM posts the question to the Question Board in the previously determined subject matter category, allowing any expert registered within the determined subject matter category to submit an answer, as indicated in step 306. In a second embodiment, the CM selects a designated number of experts, as ordered by expert rank, to direct the question to. The process then continues as described above in step 306. One skilled in the art will recognize that other question submission methods, as well as combinations of the described embodiments, also fall within the scope of the invention. Different ordering and combinations of the various steps are also contemplated.

FIGS. 4–34 include example block diagrams of the components that comprise the user interface of the Conversation Manager, as well as example screen displays of one embodiment of these components. One skilled in the art will recognize that the methods and systems of the present invention contemplate the use of other types of user interface components and methods of exchanging information with users and experts of the system, including other mechanisms for presenting the functionality of the KMS to register users and experts, participate in conversations, contribute to the ranking of experts, and manage the topology of the conversations. One skilled in the art will also recognize that the order and content of the screen displays and user interface elements in the screen displays can be modified without affecting the scope of the invention.

Figure 4:
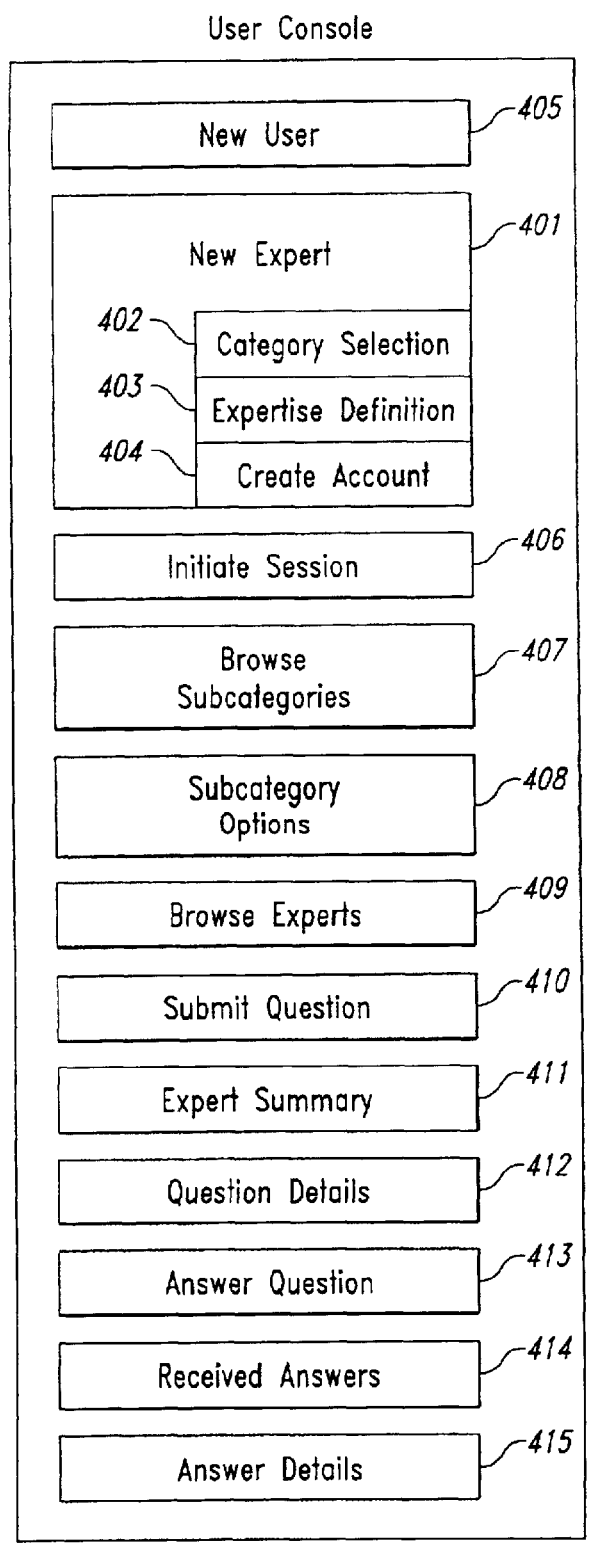
FIG. 4 is an example block diagram illustrating components that constitute the User Console portion of the CM user interface.

FIG. 4 is an example block diagram illustrating components that constitute the User Console portion of the CM user interface. These components include a New User component 405, a New Expert component 401, an Initiate Session component 406, a Browse Subcategories component 407, a Subcategory Options component 408, a Browse Experts component 409, a Submit Question component 410, an Expert Summary component 411, a Question Details component 412, an Answer Question component 413, a Received Answers component 414, and an Answer Details component 415. The user interface of each of these components is exemplified in the FIGS. 5–21, which follow.

As described earlier, prior to being allowed to participate in conversations, a user registers with the system (e.g., step 301 of FIG. 3). The purpose of user registration is to allow the CM to associate a username and password with the user and to gather and store the data necessary for notifying the user of communication directed to the user while participating in a conversation (e.g., the user's email address). Additional information may also be gathered during the user registration process.

Figure 5:
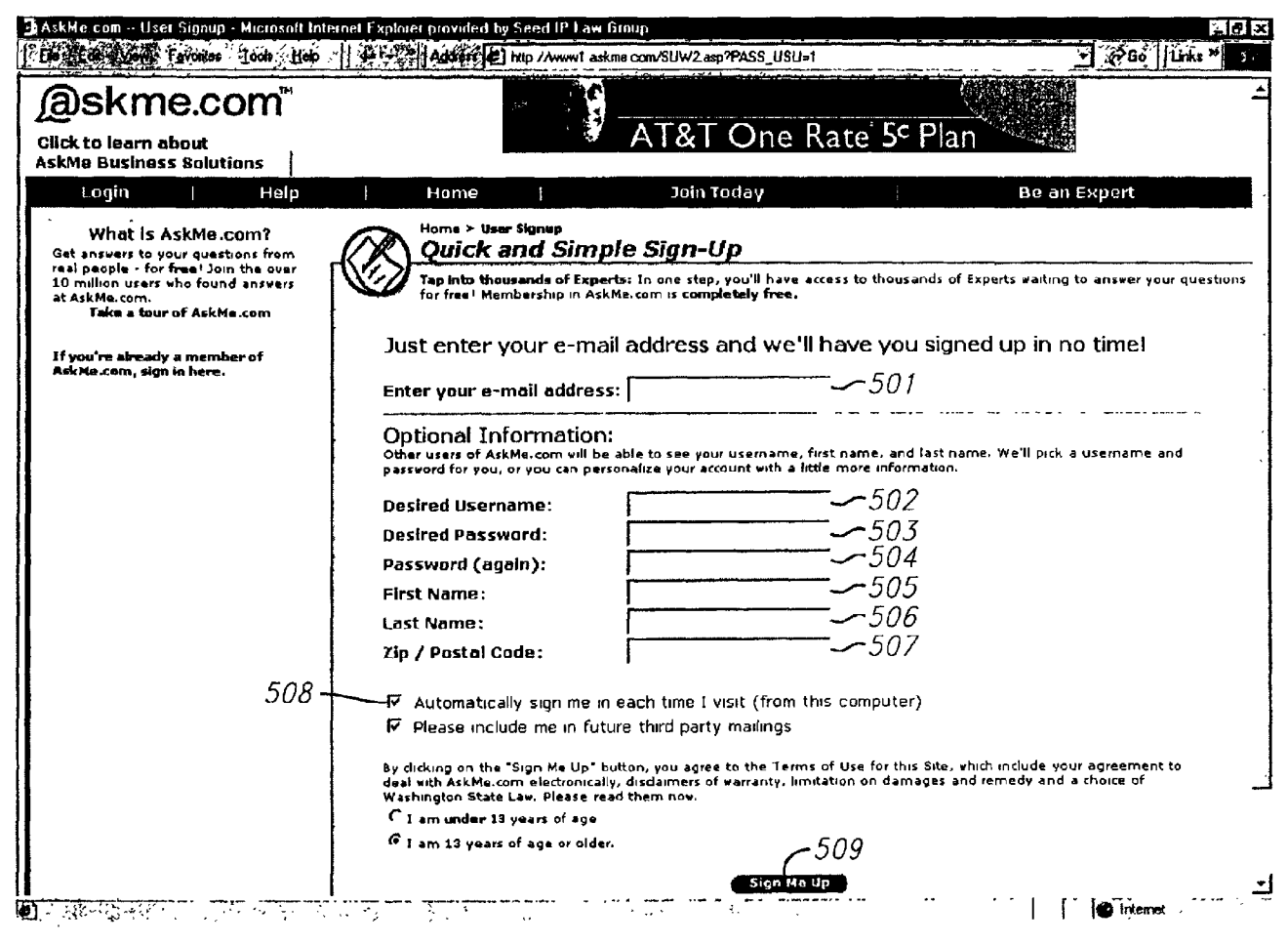

FIG. 5 is an example screen display of a New User component of the User Console, which is used by the CM to register a new user. (See, for example, New User component 405 of FIG. 4.) To register, a user enters an email address in the Email Address field 501. The user may optionally enter a desired username in the Username field 502; a desired password in the Password field 503 and the Confirmed Password field 504; a first name in the First Name field 505; a last name in the Last Name field 506; and a zip code in the Zip Code field 507. The user also may choose to be automatically logged in when using the current computer by selecting the Auto Login field 508. Selecting the Sign Me Up button 509 submits the entered data to the CM, which in turn stores the entered data in the Registered Users segment 213 of the data repository 212.

Similarly, prior to being allowed to participate in conversations, an expert registers with the system (e.g., step 302 of FIG. 3). The purpose of expert registration is threefold; first, to gather and store the data necessary to notify the expert of communication directed to the expert while the expert is participating in a conversation (e.g., the expert's email address); second, to gather and store the data necessary to identify the expert's expertise (e.g., subject matter category of expertise and description of expertise); and third, to associate a username and password with the expert if the expert is not already registered as a user.

Figure 6:
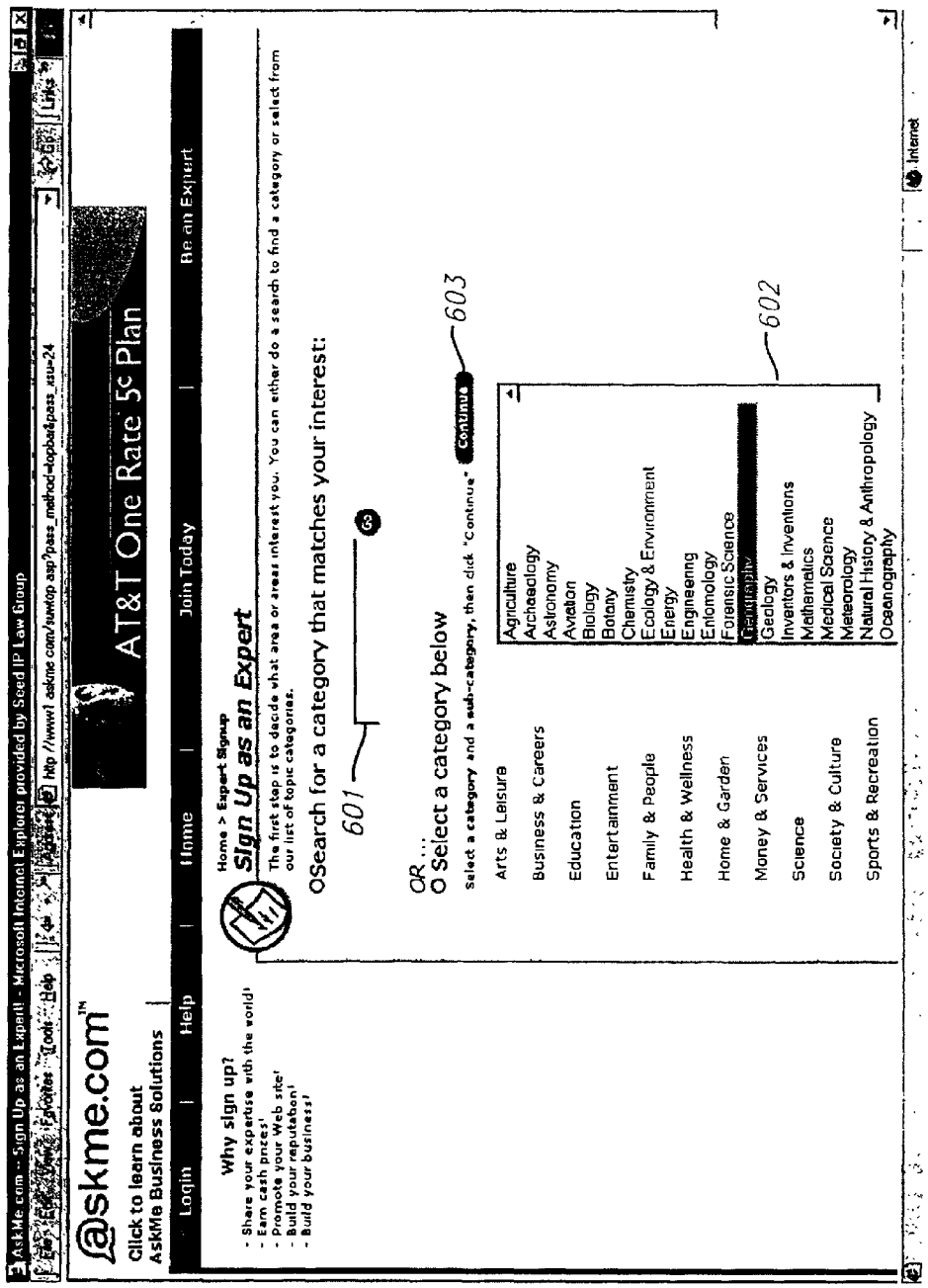
FIG. 6 is an example screen display of a Category Selection portion of the New Expert component of the CM User Console.
Figure 7:
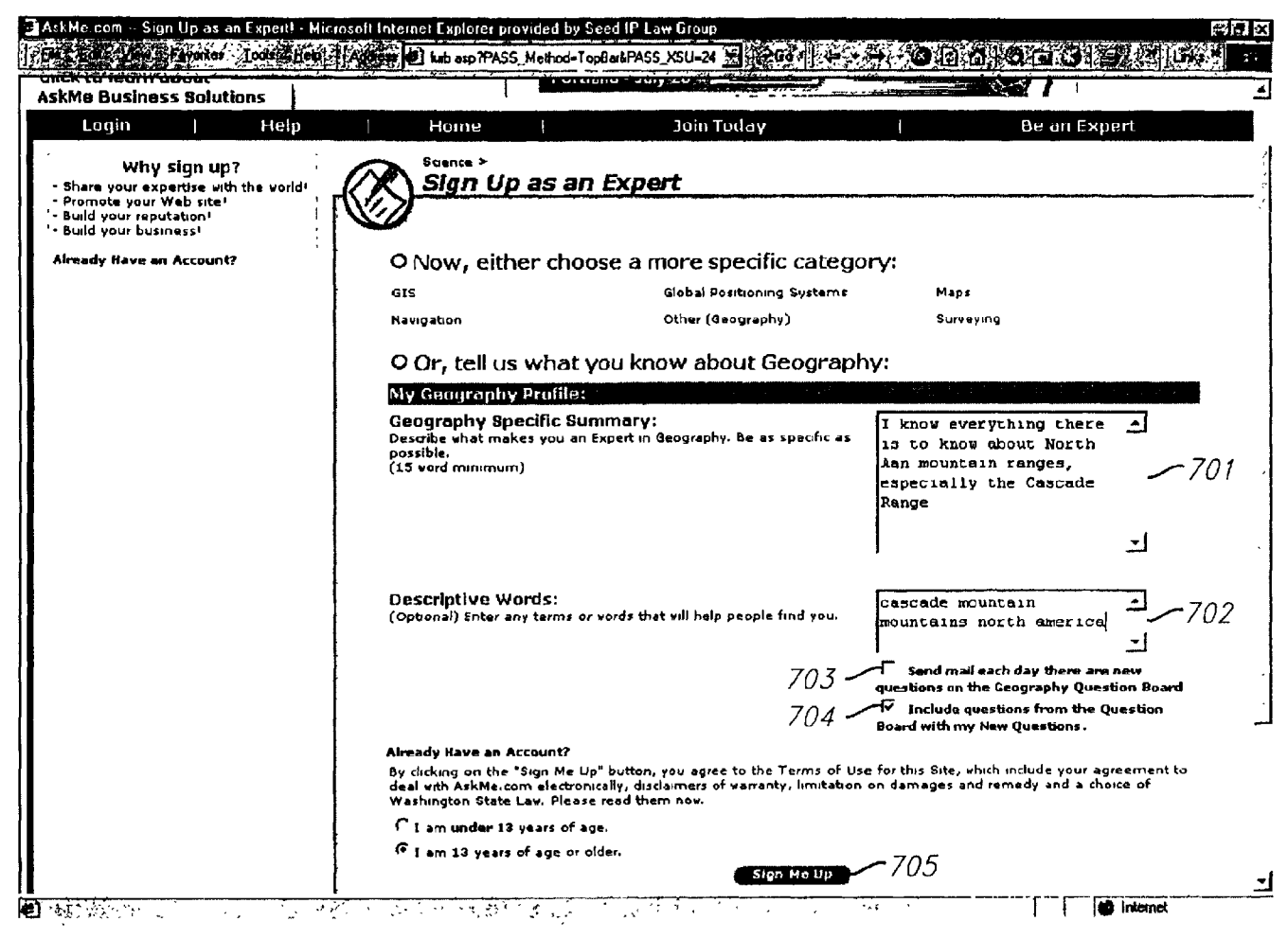
Figure 8:
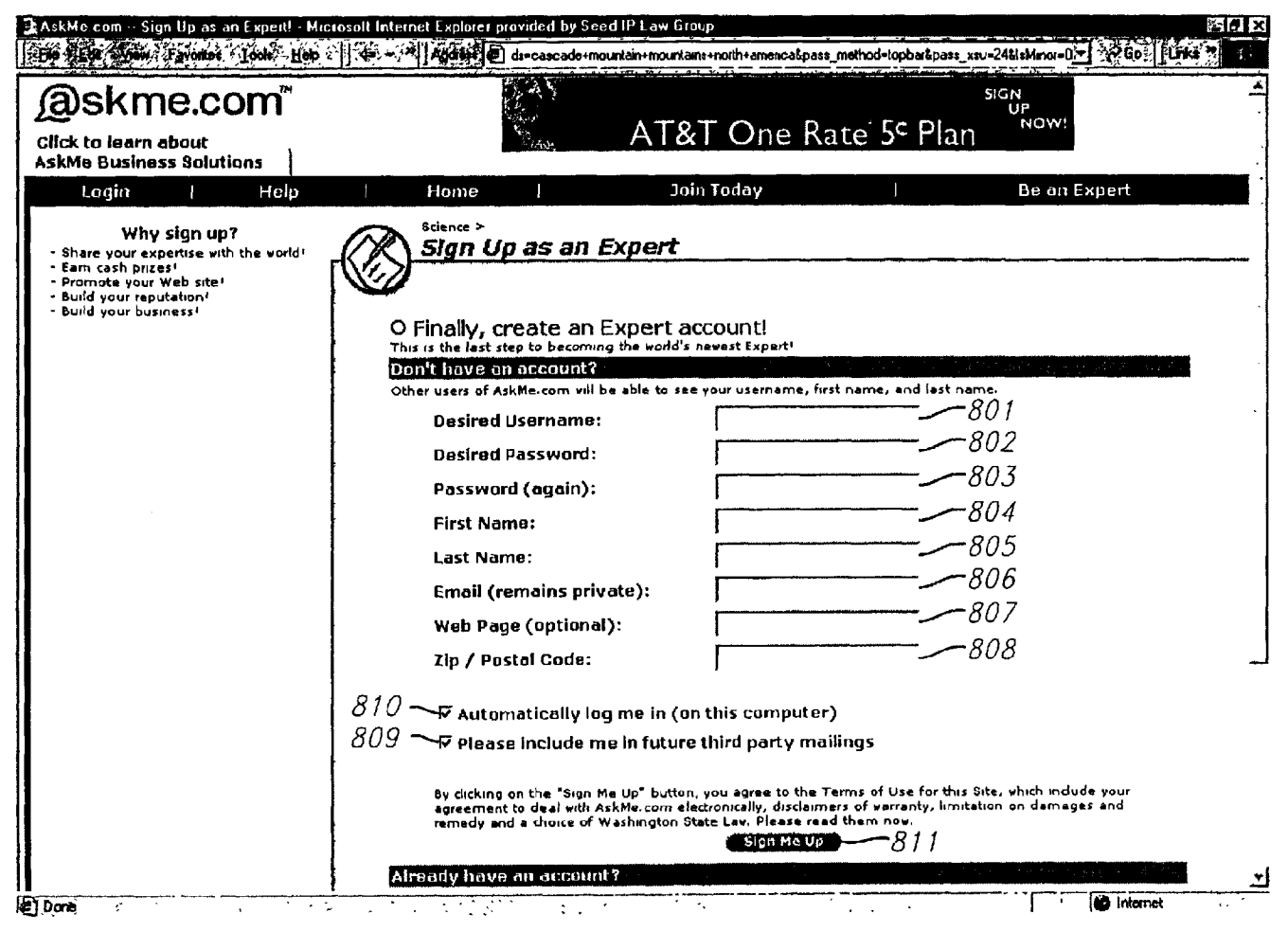

FIGS. 6 through 8 are example screen displays of portions 402, 403, and 404 of the New Expert component 401 of the User Console, which are used to register new experts. FIG. 6 is an example screen display of a Category Selection portion of the New Expert component of the CM User Console. The CM displays a search box 601, which the expert may use to perform a search to locate an appropriate subject matter category of expertise. The CM displays a list 602 of subject matter categories and subcategories, from which the expert may select a category appropriate for the expert's area of expertise. For example, using a system within a corporate environment, the employee responsible for administering the company-sponsored healthcare plans may select "Human Resources" as the top-level subject matter category, and "Benefits" as a subcategory when registering as an expert. When the Continue button 603 is selected, the CM displays the Expertise Definition portion 403 of the New Expert component 401 of the User Console.

FIG. 7 is an example screen display of an Expertise Definition portion of the New Expert component of the CM User Console. The expert enters a description of his or her expertise in the Expertise area 701, and optionally enters a list of keywords in the Descriptive Words area 702. Use of keywords will enhance an expert's chances of being identified when a user performs a search. For example, the expert associated with the company-sponsored healthcare plan may enter "insurance, health, medical, doctor, claim, dental, vision" as a list of keywords associated with his or her expertise. Optionally, by selecting the Email Notification field 703, the expert may choose to have the CM send notification by email at a set frequency (daily, hourly, or anytime a new question is posted) when new questions are added to the category's Question Board. When the Include Question Board Questions field 704 is selected, the CM displays all new Question Board questions when the expert's new questions are displayed. If the registering expert is already a registered user, selecting the Sign Me Up button 705 causes the CM to store the expert's registration information in the Registered Experts segment 214 of the data repository 212; otherwise, it causes the CM to display the Create Account portion 404 of the New Expert component 401 of the User Console.

FIG. 8 is an example screen display of a Create Account portion of the New Expert component of the CM User Console. The expert enters a desired username in the Username field 801; a desired password in the Password field 802 and the Confirmed Password field 803; a first name in the First Name field 804; a last name in the Last Name field 805; an email address in the Email Address field 806; a web page address in the Web Page field 807; and a zip code in the Zip Code field 808. The expert may choose to be automatically logged in when using the current computer by selecting the Auto Login field 810. When the Sign Me Up button 811 is selected, the CM stores the expert's registration information in the Registered Experts segment 214 of the data repository 212.

Experts preferably are allowed to register as an expert in multiple subject matter categories. Subsequent subject matter category expertise registration consists of the steps described in relation to FIGS. 6 and 7 above, in each category the expert chooses to register. In an alternate embodiment, the CM pre-fills the fields that have been previously filled so as to minimize the amount of data entry required for the addition of each new subject matter category of expertise.

Referring again to FIG. 3, which discusses the overall process for one method of submitting a question and receiving a response, once a user is registered, the user may submit questions to registered experts by subject matter category. Submitting a question is comprised of three steps: selecting a subject matter category (step 303), selecting an expert (step 304), and submitting a question (step 305).

Figure 9:
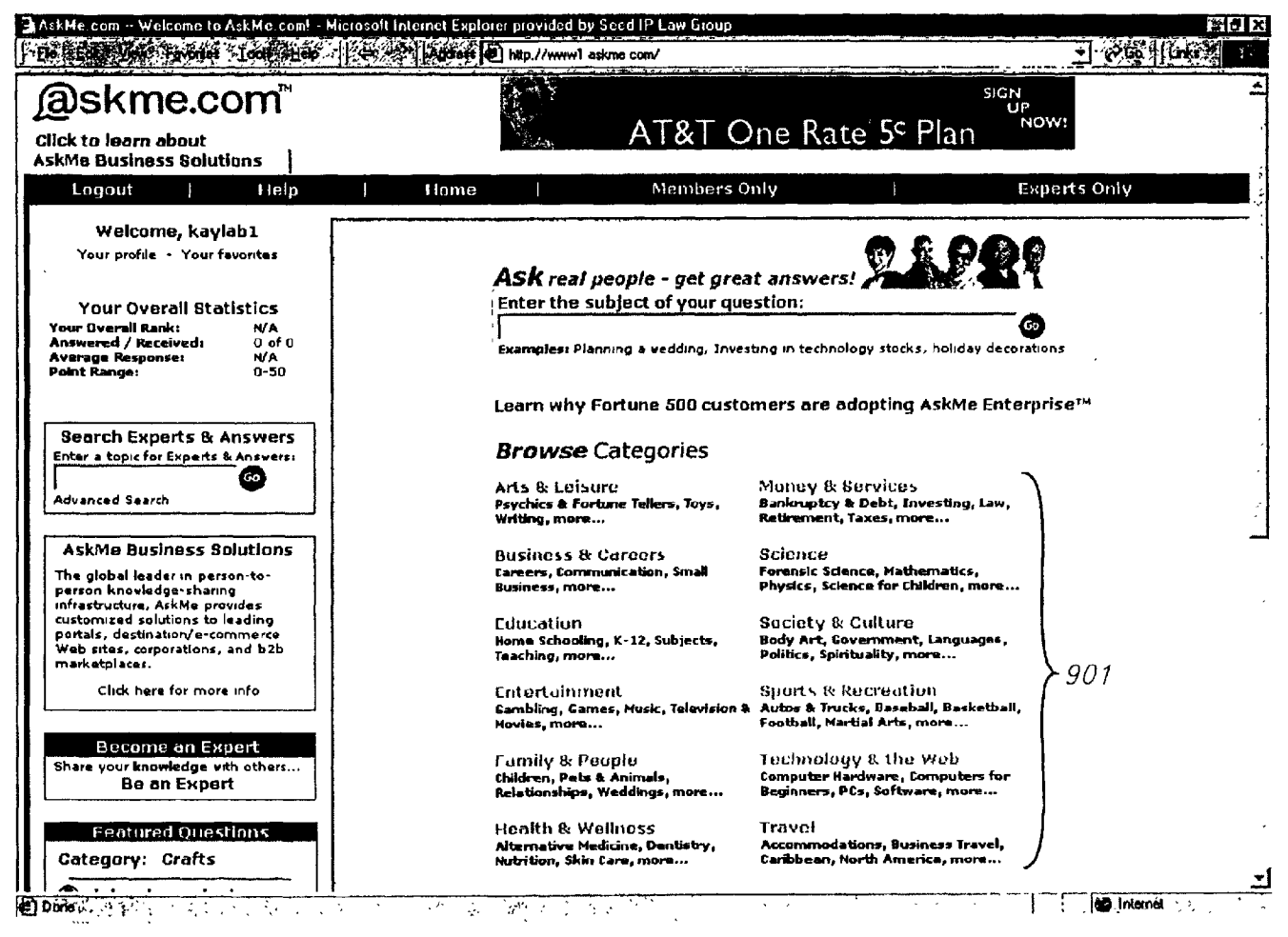

FIG. 9 is an example screen display of an Initiate Session component of the CM User Console. The CM displays a list of the top-level categories in the Subject Matter Category Index in the Browse Categories area 901. When a subject matter category is selected, the CM displays the Browse Subcategories component 407 of the User Console.

Figure 10:
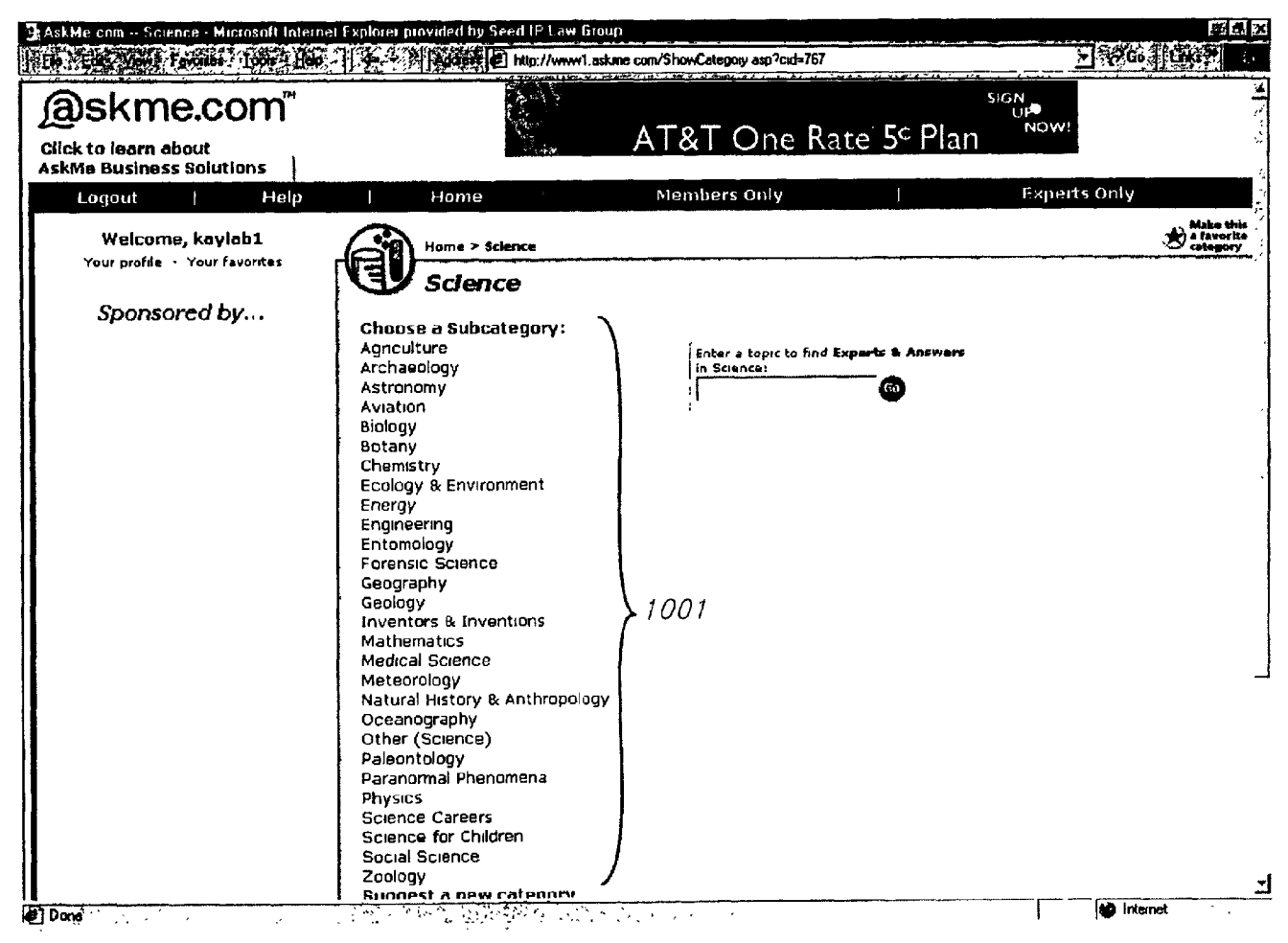

FIG. 10 is an example screen display of a Browse Subcategories component of the CM User Console. The CM displays a List of Subcategories 1001 based on the subject matter category selected from the previous screen, shown in FIG. 9, above. When a subcategory is selected from the list, the CM displays the Subcategory Options component 408 of the User Console.

Figure 11:
FIG. 11 is an example screen display of a Subcategory Options component of the CM User Console.

FIG. 11 is an example screen display of a Subcategory Options component of the CM User Console. The CM displays a list of more Detailed Subcategories 1101 that the user may select from to further target a specific subject matter category. When the Find An Expert button 1102 is selected, the CM displays the Browse Experts component 409 of the User Console.

Figure 12:
FIG. 12 is the top section of an example screen display showing a Browse Experts component of the CM User Console.
Figure 13:
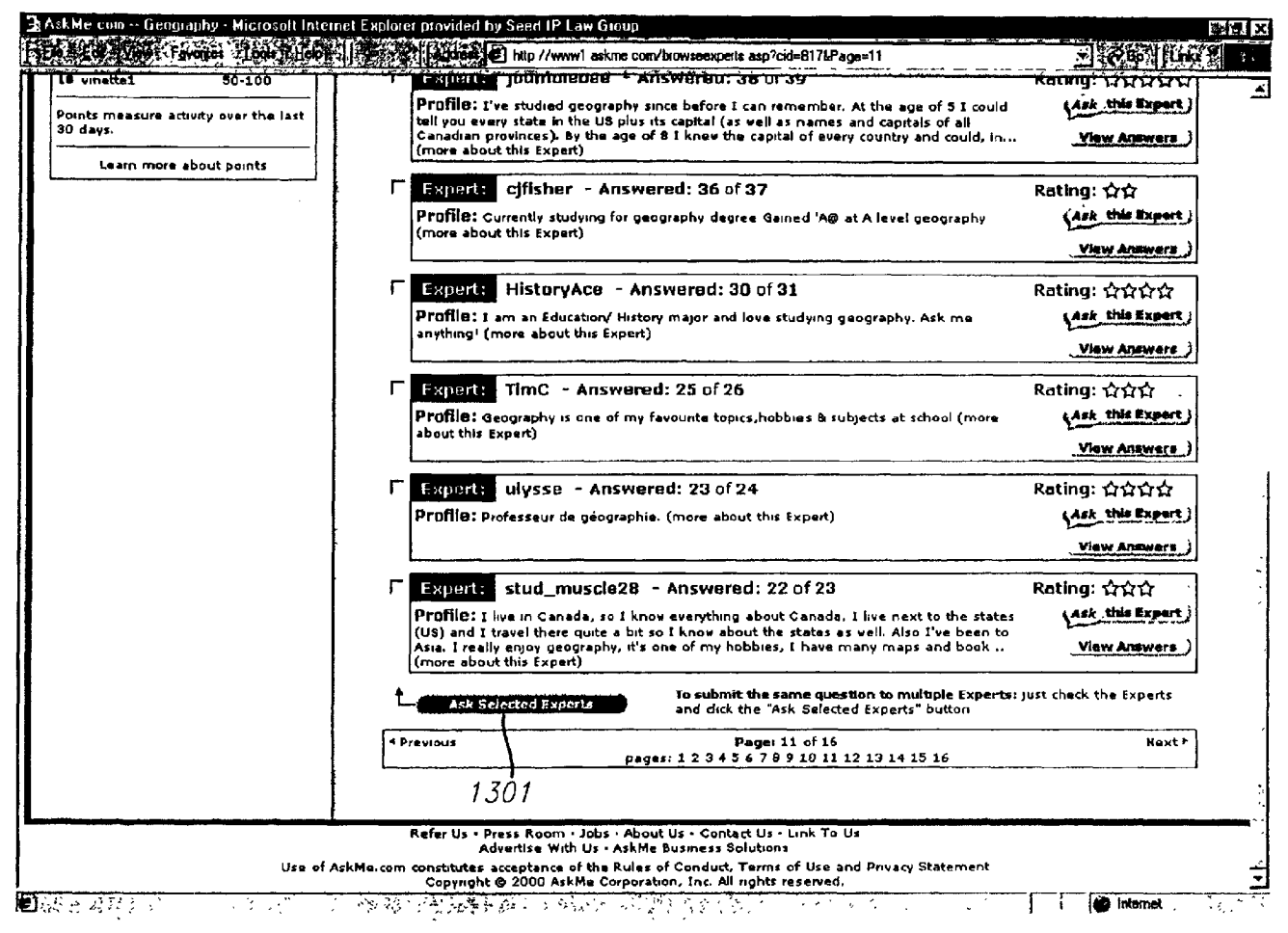

Referring again to FIG. 3, after a specific subject matter category has been selected (step 303), the user selects an expert (step 304). FIGS. 12 and 13 are the top and bottom sections of an example screen display showing a Browse Experts component of the CM User Console. The CM displays a List of Experts 1205 in the selected subject matter category or subcategory, ordered by expert rank, with the highest ranked experts appearing at the top of the list. One or more experts can be identified to receive the question by selecting the checkbox 1201 next to each desired expert listing. When the "more about this Expert" link 1202 is selected for a particular expert, the CM displays the expert's expertise description. When the View Answers button 1203 is selected for the expert, the CM displays a list of all questions answered by this expert in the designated category or subcategory. When the Ask This Expert button 1204 is selected for the expert, the CM displays the Submit Question component 410 of the User Console, with the question addressed to only the designated expert. When multiple experts are selected (with multiple checkboxes 1201) and the Ask Selected Experts button 1301 is selected, the CM displays the Submit Question component 410 of the User Console, with the question addressed to all of the selected experts.

Figure 14:
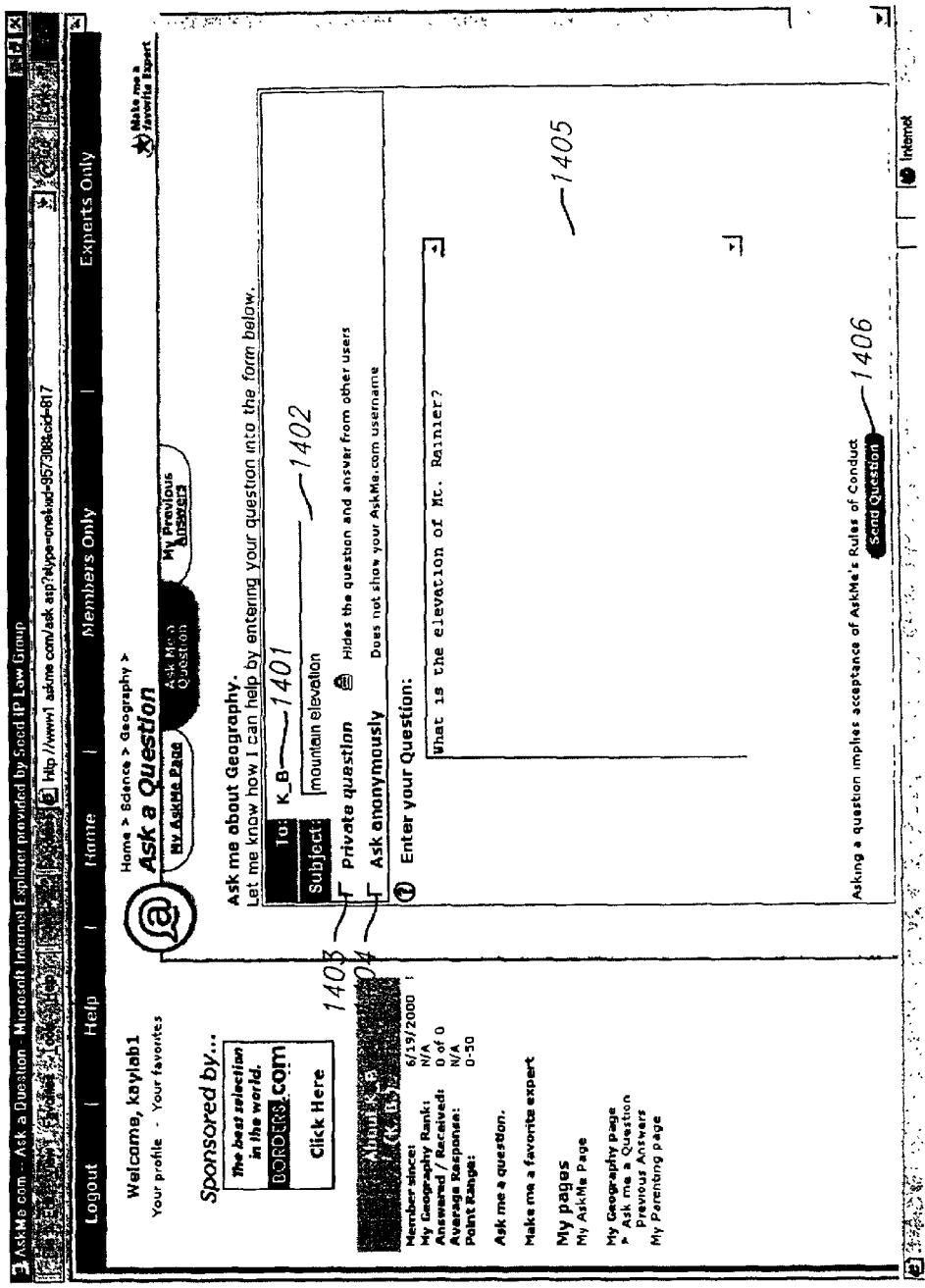
FIG. 14 is an example screen display showing a Submit Question component of the CM User Console.

After selecting one or more experts (step 304 of FIG. 3), the user may submit a question (step 305). FIG. 14 is an example screen display showing a Submit Question component of the CM User Console. The CM populates the To field 1401 with the usernames of the previously selected experts. The user enters a subject for the question in the Subject field 1402. When the Private Question field 1403 is selected, the CM prohibits the conversation from being publicly displayed to others within the system. Private conversations are visible only to the user and expert(s) participating in the conversation. Private conversations are stored within the system and statistical information (e.g., the timeliness of the expert's response and the rating submitted by the user) associated with the conversation is maintained. The stored statistical information for private conversations preferably is used by the CM when calculating expert rank, even though the private conversations are not displayable to any system users other than the conversation participants. If the Ask Anonymously field 1404 is selected, the CM will prohibit the system from displaying the user's username when displaying the question. The user enters the text of the question in the Question area 1405. When the Send Question button 1406 is selected, the CM launches the SubmitQuestion routine 209, which stores the question in the Conversations segment 216 of the data repository 212 and notifies the selected experts of the question, so that the question can be answered.

Figure 15:
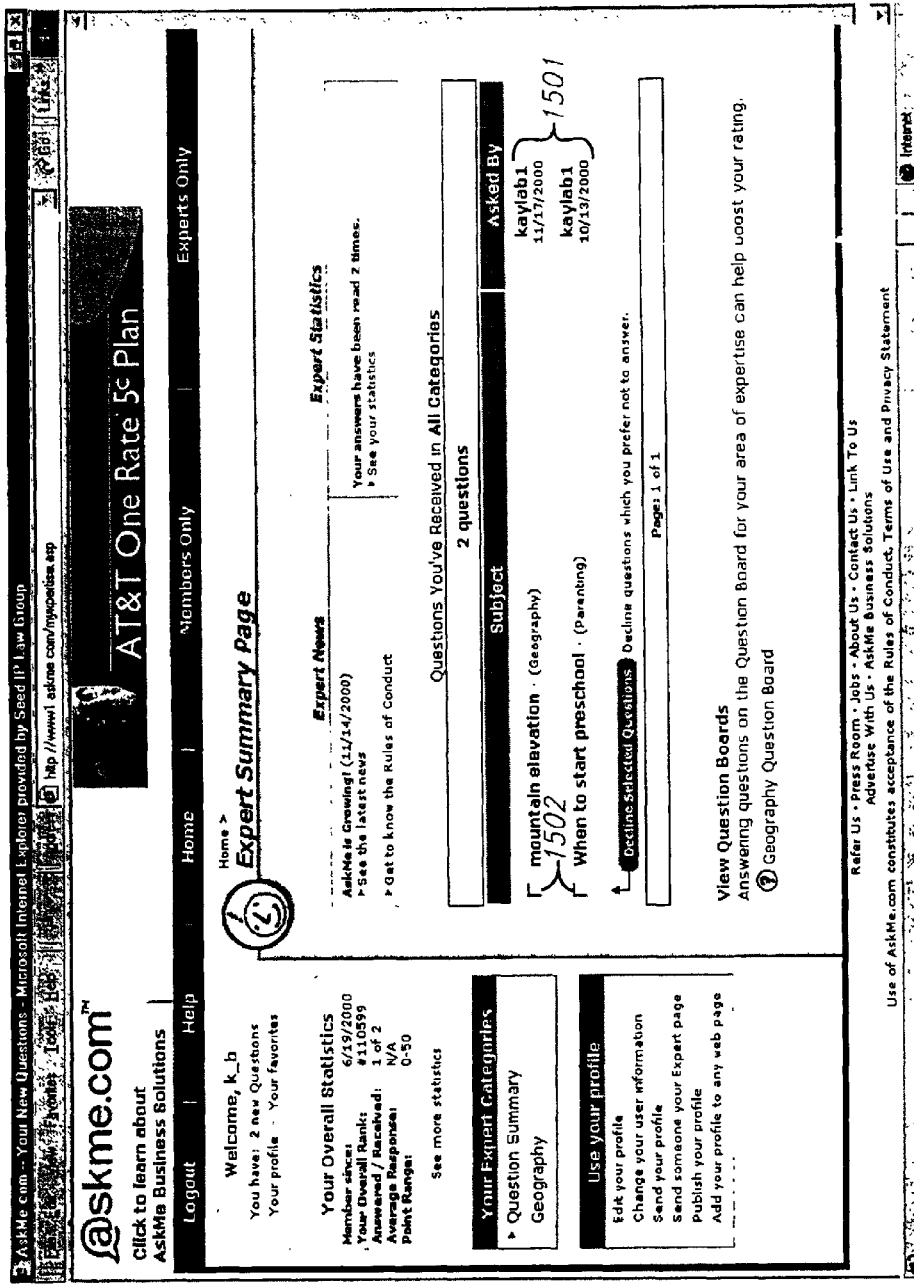
FIG. 15 is an example screen display of an Expert Summary component of the CM User Console.

After receiving notification of a new question by email or through the user interface, an expert may submit an answer to the question (e.g., step 306 of FIG. 3). FIG. 15 is an example screen display of an Expert Summary component of the CM User Console. The CM displays a Question List 1501 of questions directed to the expert. Optionally, the CM displays a New Question Board Questions List (Not shown) of new questions posted to the Question Boards for the subject matter categories in which the expert has previously registered. Whether or not the New Question Board Question List is displayed is based on the preferences selected by the expert during expert registration (e.g., step 302 of FIG. 3). When a Question 1502 is selected, the CM displays the Question Details component 412 of the User Console.

Figure 16:
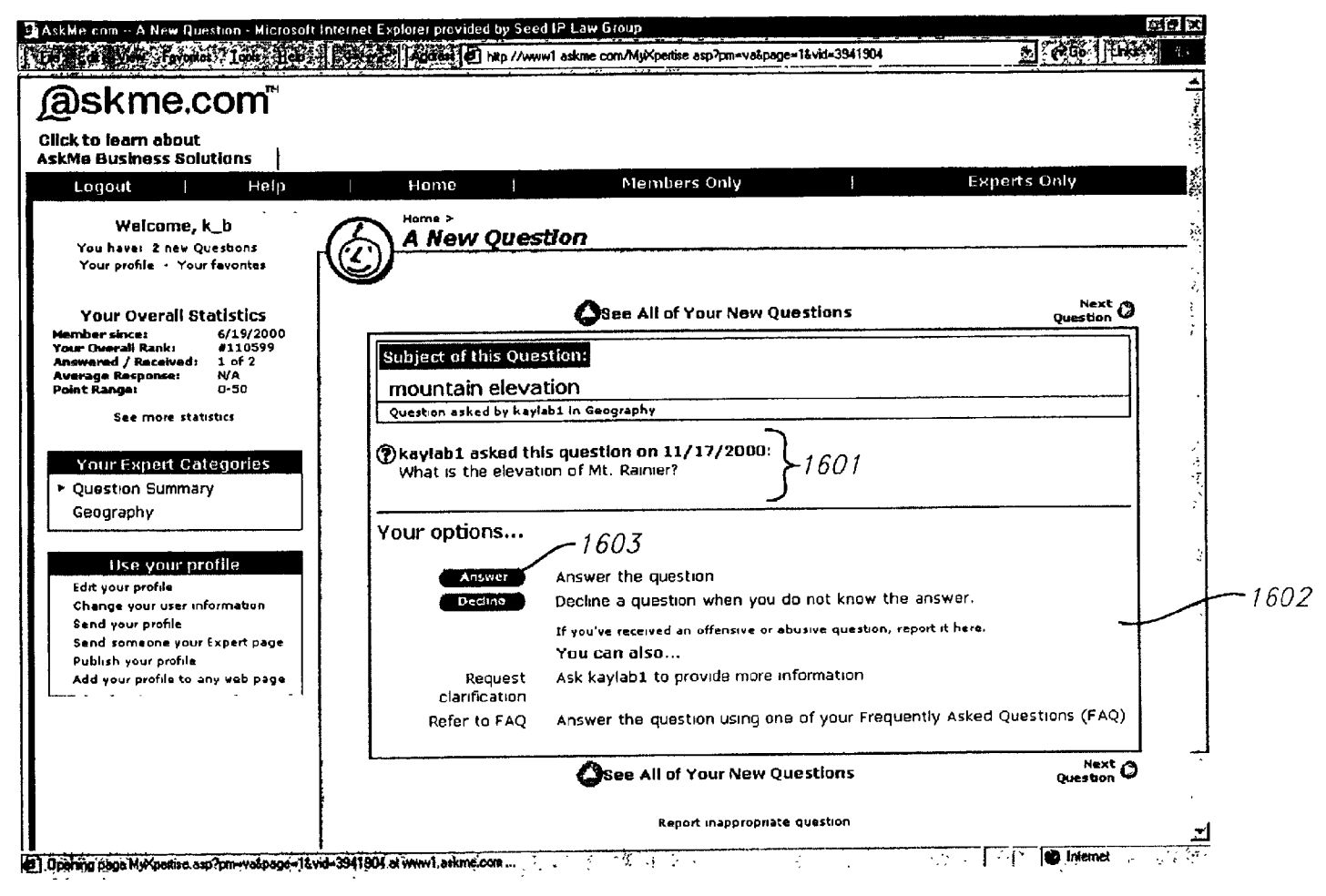

FIG. 16 is an example screen display of a Question Details component of the CM User Console. The CM displays the conversation history in the History area 1601 and a list of actions in the Expert Options area 1602. The expert has the option of answering the question, declining the question, requesting clarification, or answering the question from the expert's Frequently Asked Questions (FAQ) list. When the Answer button 1603 is selected, the CM displays the Answer Question component 413 of the User Console.

Figure 17:
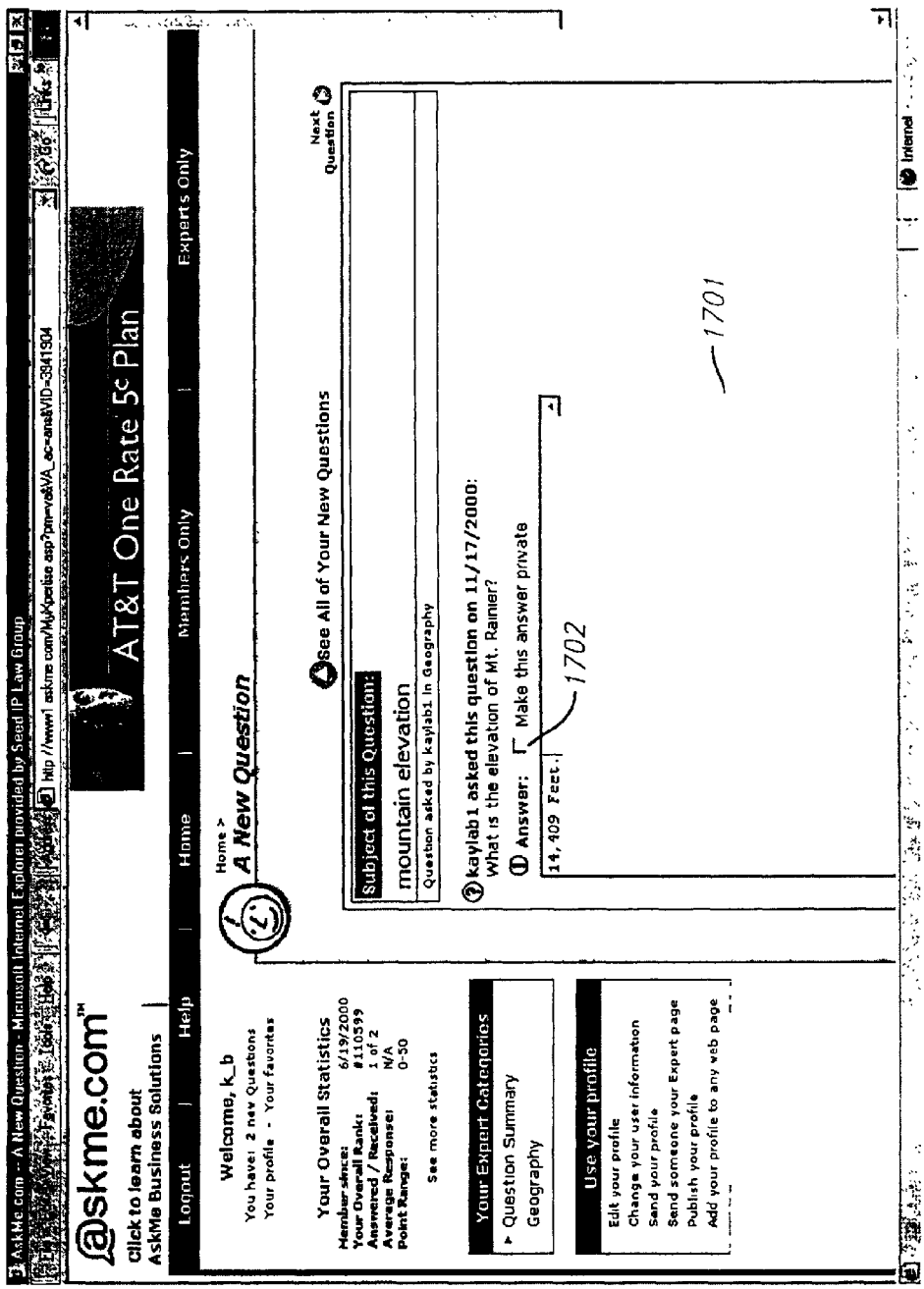
FIG. 17 is the top section of an example screen display of an Answer Question component of the CM User Console.
Figure 18:
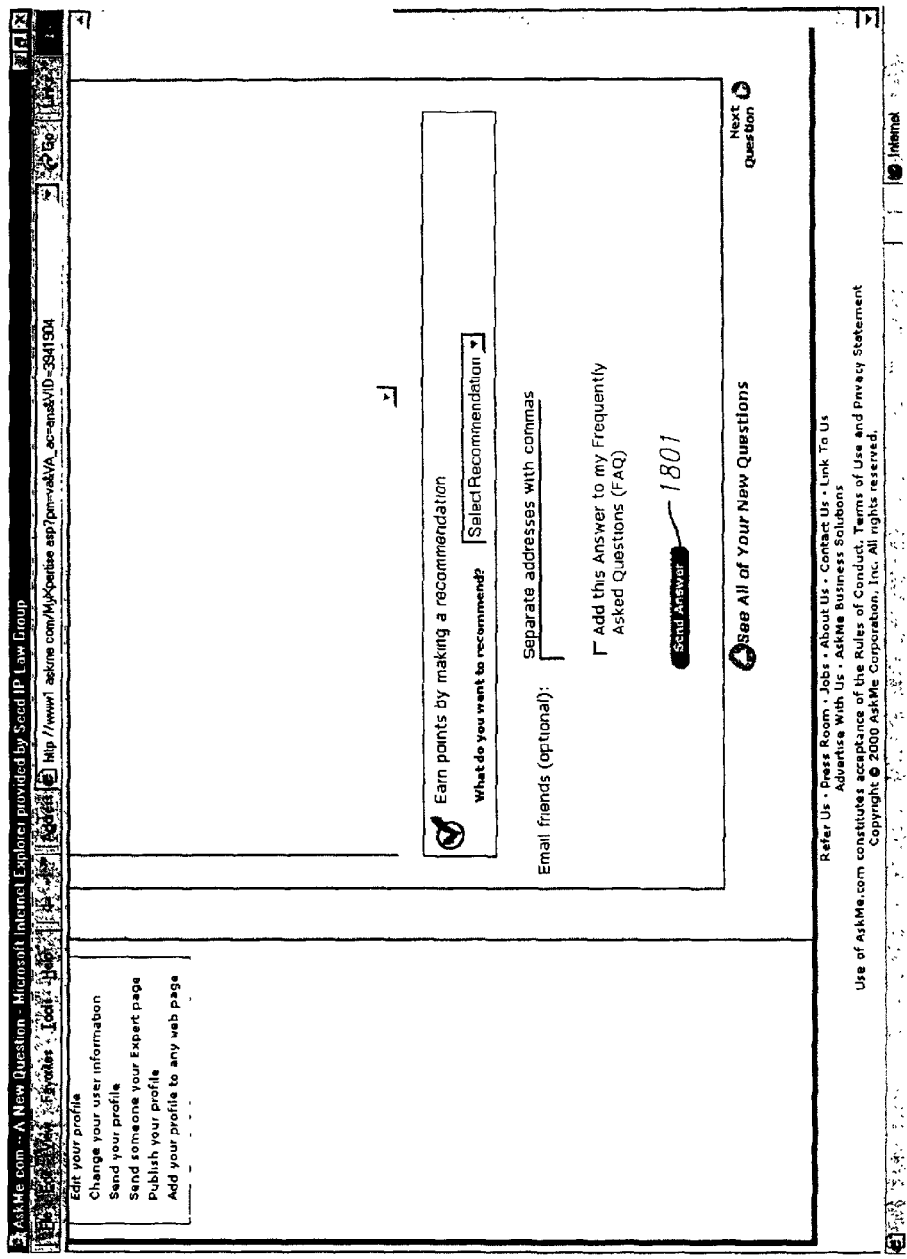
FIG. 18 is the bottom section of an example screen display of an Answer Question component of the CM User Console.

FIGS. 17 and 18 are the top and bottom sections of an example screen display of an Answer Question component of the CM User Console. To answer a question, the expert enters the answer to the question in the Answer area 1701. When the Private field 1702 is selected, the CM stores the conversation as a private conversation. Private conversations are discussed in detail above, with reference to FIG. 14. When the Send Answer button 1801 is selected, the CM stores the answer and associates it with the appropriate question in the Conversations segment 216 of the data repository 212. The CM also notifies the user that an answer has been submitted.

Figure 19:
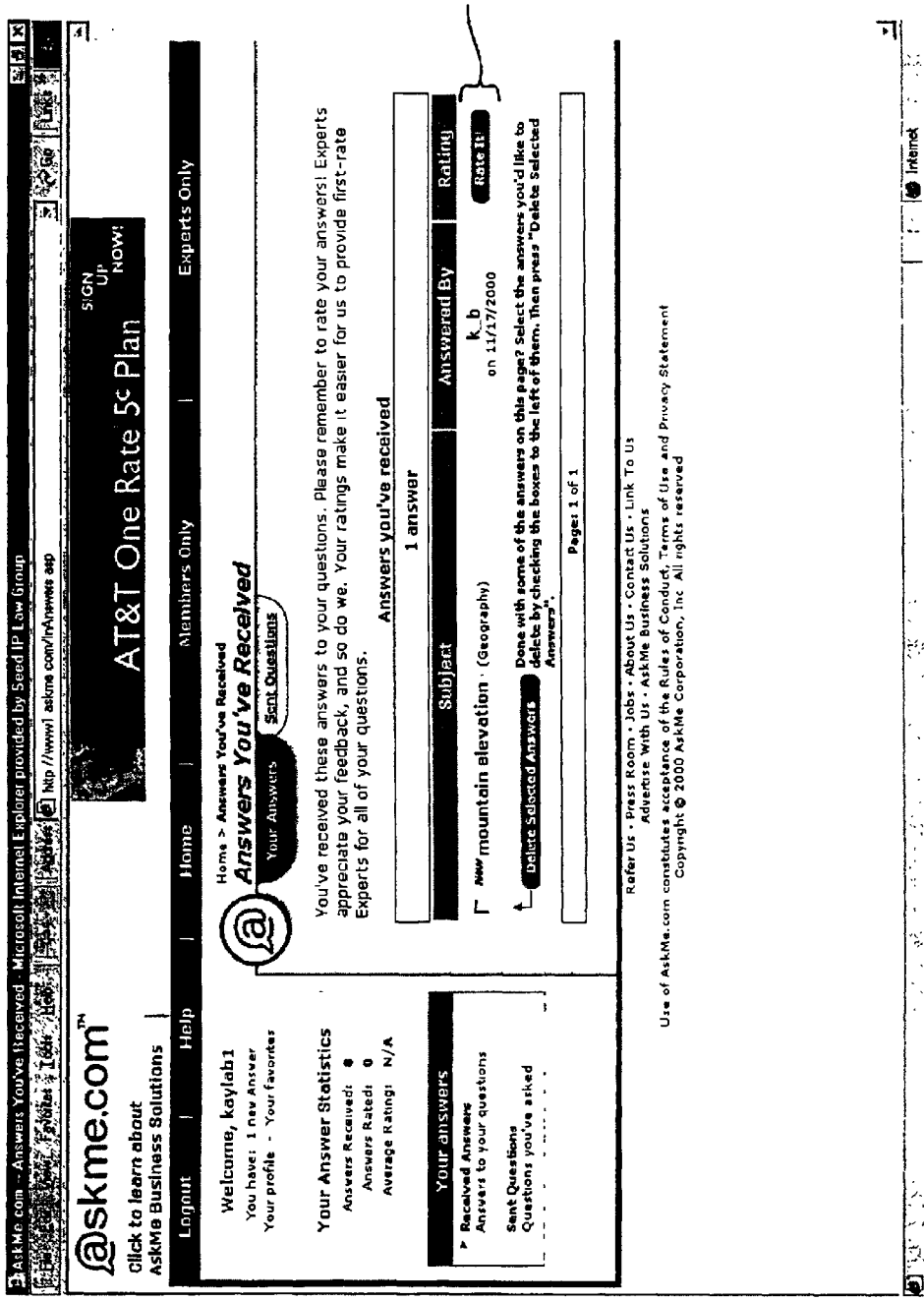
FIG. 19 is an example screen display of a Received Answers component of the CM User Console.

FIG. 19 is an example screen display of a Received Answers component of the CM User Console. The CM displays a list of all of the answers that a user has received to posted questions in the Answers area 1901. When the subject of one of the answers is selected, the CM displays the Answer Details component 415 of the User Console.

Figure 20:
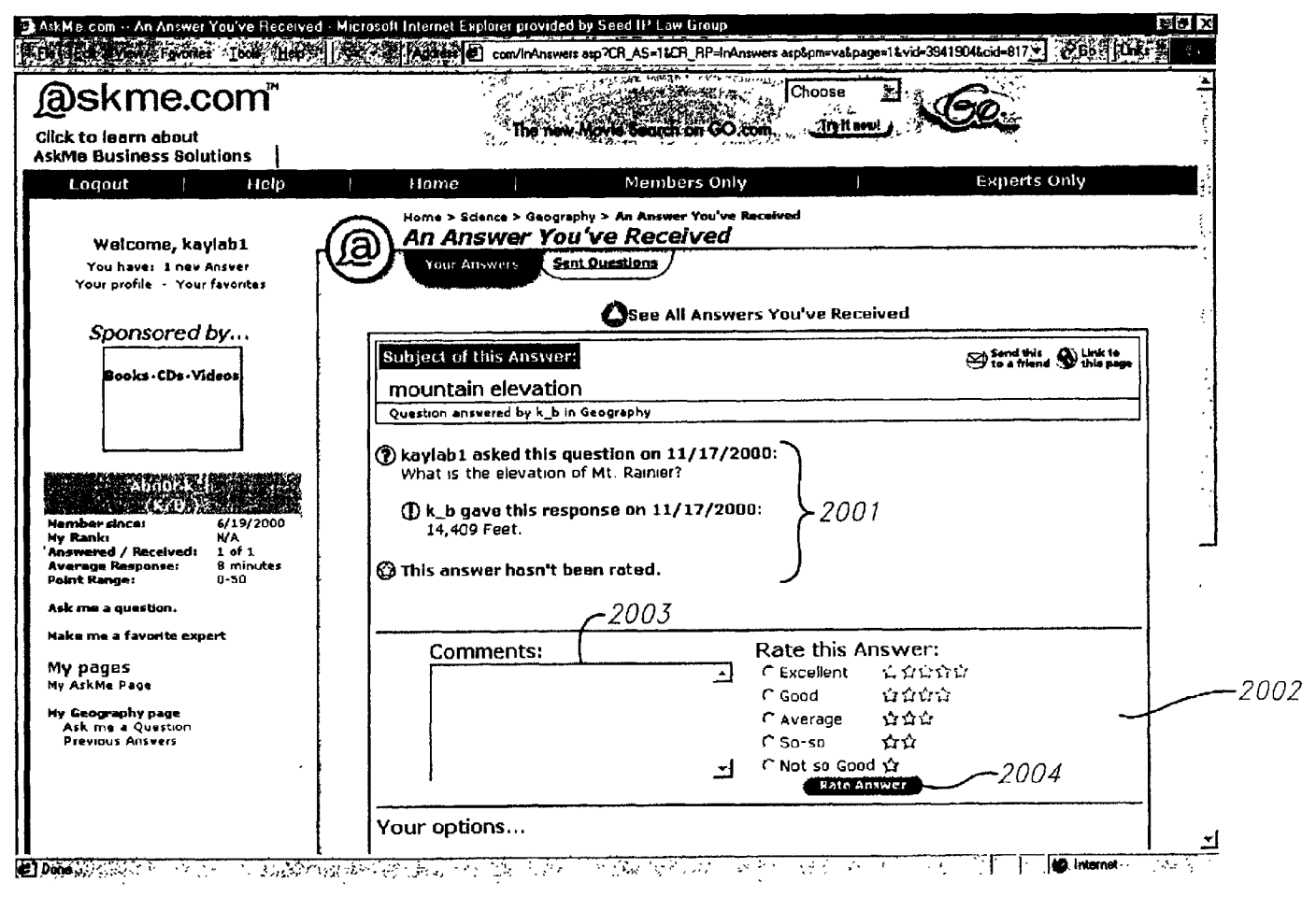
Figure 21:
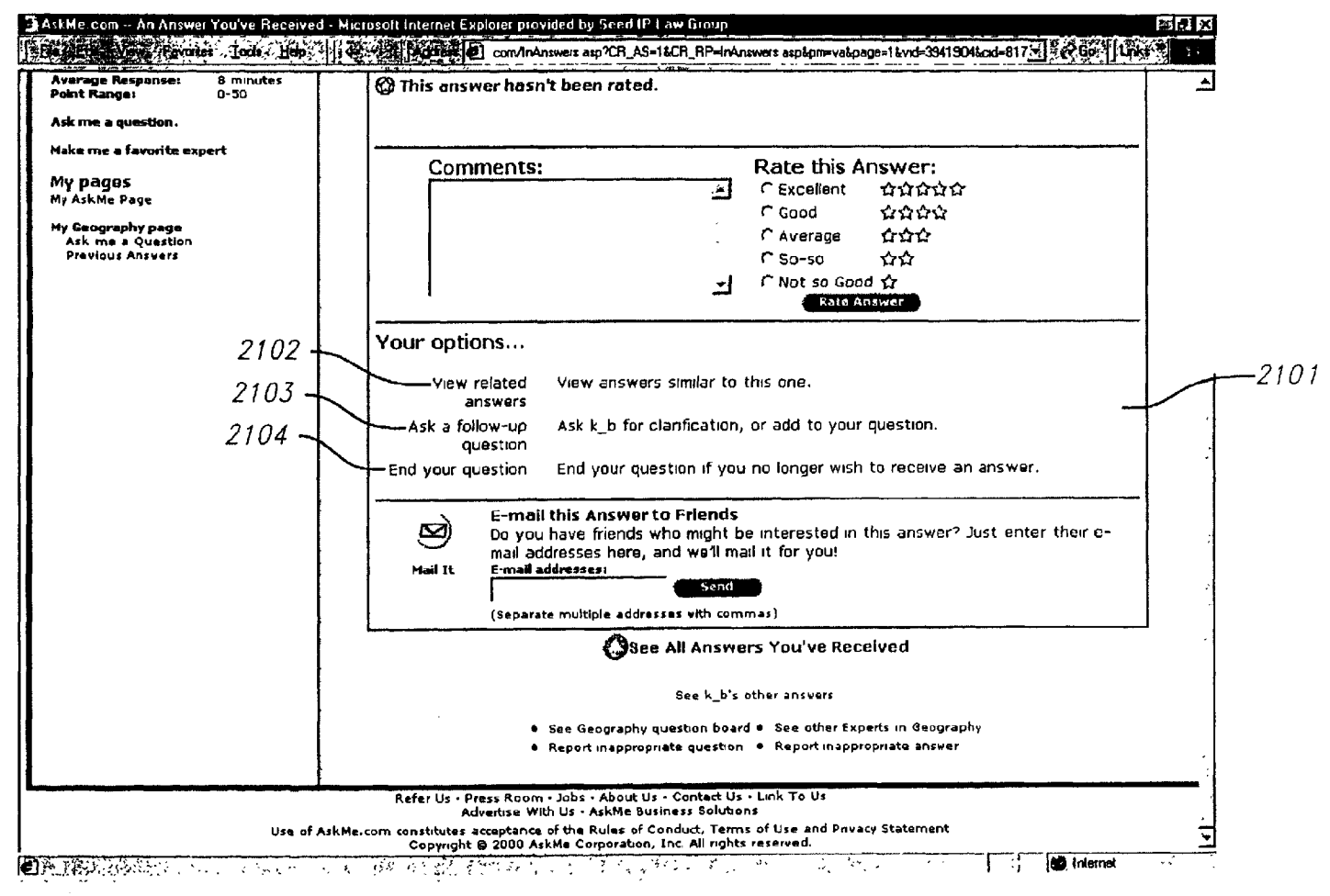

FIGS. 20 and 21 are the top and bottom sections of an example screen display of an Answer Details component of the CM User Console. The CM displays the conversation history in area 2001, room for comments and ratings in areas 2003 and 2002, respectively, and a list of actions in a User Options area 2101. In the Comment and Rating areas 2003 and 2002, the user may enter a comment about the answer and/or select a rating for the answer to indicate the level of user satisfaction with the answer. (See for example, step 307 of FIG. 3). When a rating is indicated and the Rate Answer button 2004 is selected, the CM stores the indicated rating in the data repository. The actions available in the User Options area 2101 include giving the user the option to view related answers, ask the responding expert a follow-up question, or end the conversation. When the "View related answers" option 2102 is selected, the CM performs a keyword search for other similar conversations, and displays the similar conversations. When the "Ask a follow-up question" option 2103 is selected, the conversation continues by the CM submitting the question (for example, step 305 of FIG. 3). When the "End your question" option 2104 is selected, the conversation is terminated.

Figure 22:
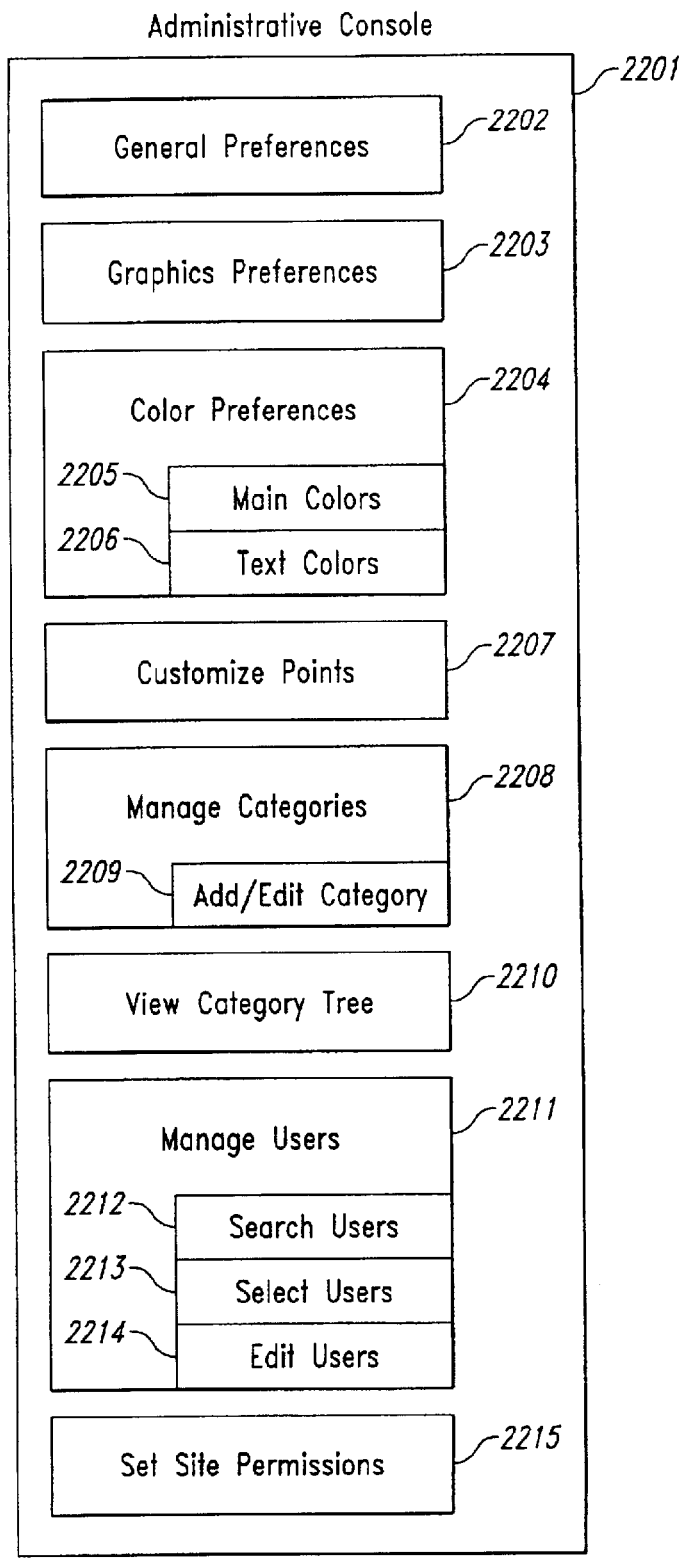
FIG. 22 is an example block diagram illustrating components that constitute the Administrative Console portion of the CM user interface.

FIG. 22 is an example block diagram illustrating components that constitute the Administrative Console portion of the CM user interface. The Administrative Console 2201 comprises: a General Preferences component 2202, a Graphics Preferences component 2203, a Color Preferences component 2204, a Customize Points component 2207, a Manage Categories component 2208, a View Category Tree component 2210, a Manage Users component 2211, and a Set Site Permissions component 2215. Each of these components enables various customization of the overall enhanced knowledge management system including the appearance of the user interface and the organization of the knowledge base in terms of the conversation topology (the categories, subcategories, etc.). The CM allows Super Administrators (SAs) access to all components of the Administrative Console 2201, and allows Category Administrators (CAs) access only to the Manage Categories component 2208 of the Administrative Console 2201.

FIG. 23 is an example screen display of a General Preferences component of the CM Administrative Console. The Company Name field 2301 is used to store the name of the company (or other entity) utilizing the system. The Service Name field 2302 stores the name that is chosen for the enhanced knowledge management system. This name is displayed as the system title and is included in outbound email notifications to users. An example service name may be, for example, "ACME Q&A Service." The Home Page field 2303 stores the selectable text that is displayed in the menu bar on each display screen, providing direct access to the Initiate Session component (e.g., 406 of FIG. 4) of the User Console. The Tagline field 2304 stores additional text for inclusion in email notifications sent to users. Example taglines may include, for example, "Answers from Real Experts!" or "Ask Real People." The Email Address field 2305 stores the return email address that is used for all emails that are automatically sent from the enhanced KMS. For privacy and security reasons, a system administrator may want to designate an email address specifically for system communications. When the Sidebar Company Logo field 2306 is selected, the CM displays a company logo in the sidebar of each display screen. When the Contact Administrator field 2307 is selected, the CM displays a selectable field on each display screen that allows users to send an email message to all Super Administrators. This provides users with the ability to easily contact a system administrator with questions or comments concerning the system. When the Rating System field 2308 is selected, the CM allows users to rate the answers submitted by experts. The field may be de-selected, in which case ratings of answers are not gathered and are not used when calculating the expert rank associated with each registered expert. Instead, the CM uses other factors (e.g., number of pending requests, number of previously submitted responses, and response time) to order the experts within the categories. Selecting the Disclaimer field 2309 allows the Super Administrator to enter text in the Disclaimer Text field 2310 which the CM displays at the bottom of each display screen. When the Feature Expert field 2311 is selected, the CM displays a portion of the Expert Profile that corresponds to one or more top-ranked experts on the Initiate Session display screen. When the Easy Ask field 2312 is selected, the CM allows users to submit questions without first selecting a subject matter category and expert. With this feature enabled, the CM selects the most appropriate subject matter category and expert(s) for the user's question based on the user-submitted subject text and question text as described earlier. The Example Subject field 2313 is available when the Easy Ask field 2312 is selected, and stores text that the CM displays as an example subject for users to reference when submitting subject text for a question. When the External Program Integration field 2314 (labeled "Outlook Integration" in the example screen display) is selected, the CM allows users to install a utility that integrates an external program, such as Microsoft Outlook, with the system. The utility allows users to search for experts from within the external program and, when the program is an email program, allows experts to reply to emails from their FAQs or to create FAQs from within the email program. Although shown specifically with reference to Microsoft Outlook, one skilled in the art will recognize that it is within the scope of this invention to extend this external program invocation ability to other programs other than Outlook or other email programs, and that the functionality available as a result is inherently tied to the type of external program integrated. When the Update button 2315 is selected, the CM stores the specified general preferences in the Administrative Settings segment 222 of the data repository 212.

Figure 24:
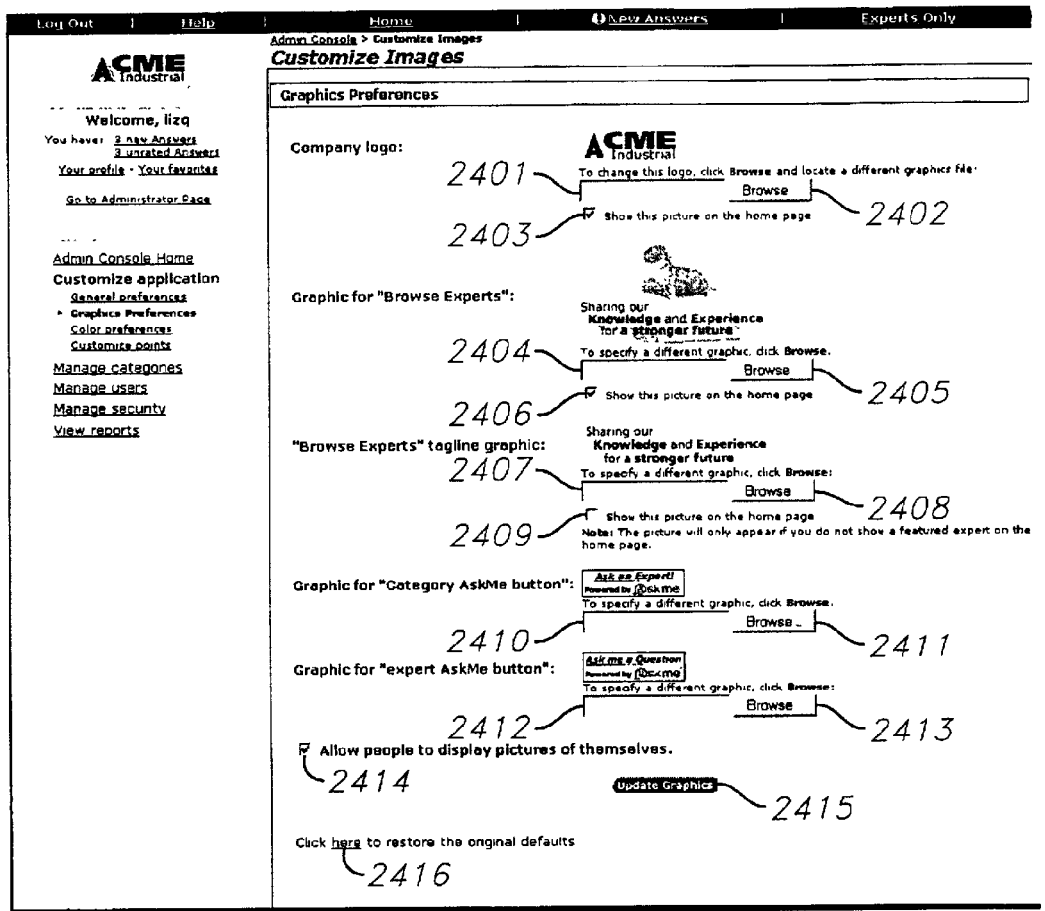
FIG. 24 is an example screen display of a Graphics Preferences component of the CM Administrative Console.

FIG. 24 is an example screen display of a Graphics Preferences component of the CM Administrative Console. The "Company logo" field 2401 is used to identify the file containing the image to be displayed as the company logo within the user interface. The "Browse Experts" Graphic field 2404 and the "Browse Experts" Tagline Graphic field 2407 are used to identify files containing images to be displayed along with or instead of descriptive text within the CM User Console. The Graphic for "Category AskMe button" and the Graphic for "Expert AskMe button" fields 2410 and 2412 are used to identify files containing images to be displayed as buttons within the User Console. The Browse buttons, 2402, 2405, 2408, 2411, and 2413, when selected, launch a file selection window through which a user can navigate to and select the appropriate file that corresponds to the images desired. The Company Logo, Graphic for "Browse Experts" and Tagline Graphic for "Browse Experts" can each be activated for display on the Initiate Session display screen of the User Console by selecting the appropriate "Show This Picture on the Home Page" checkbox, 2403, 2406, or 2409. The Individual Pictures checkbox 2414, when selected, enables functionality that allows experts to display pictures of themselves within the user interface. When the system administrator is done making selections, the administrator selects the Update Graphics button 2415 to cause the system to store the selections. The system defaults are restored when the system administrator selects the Restore Defaults link 2416.

Figure 25:
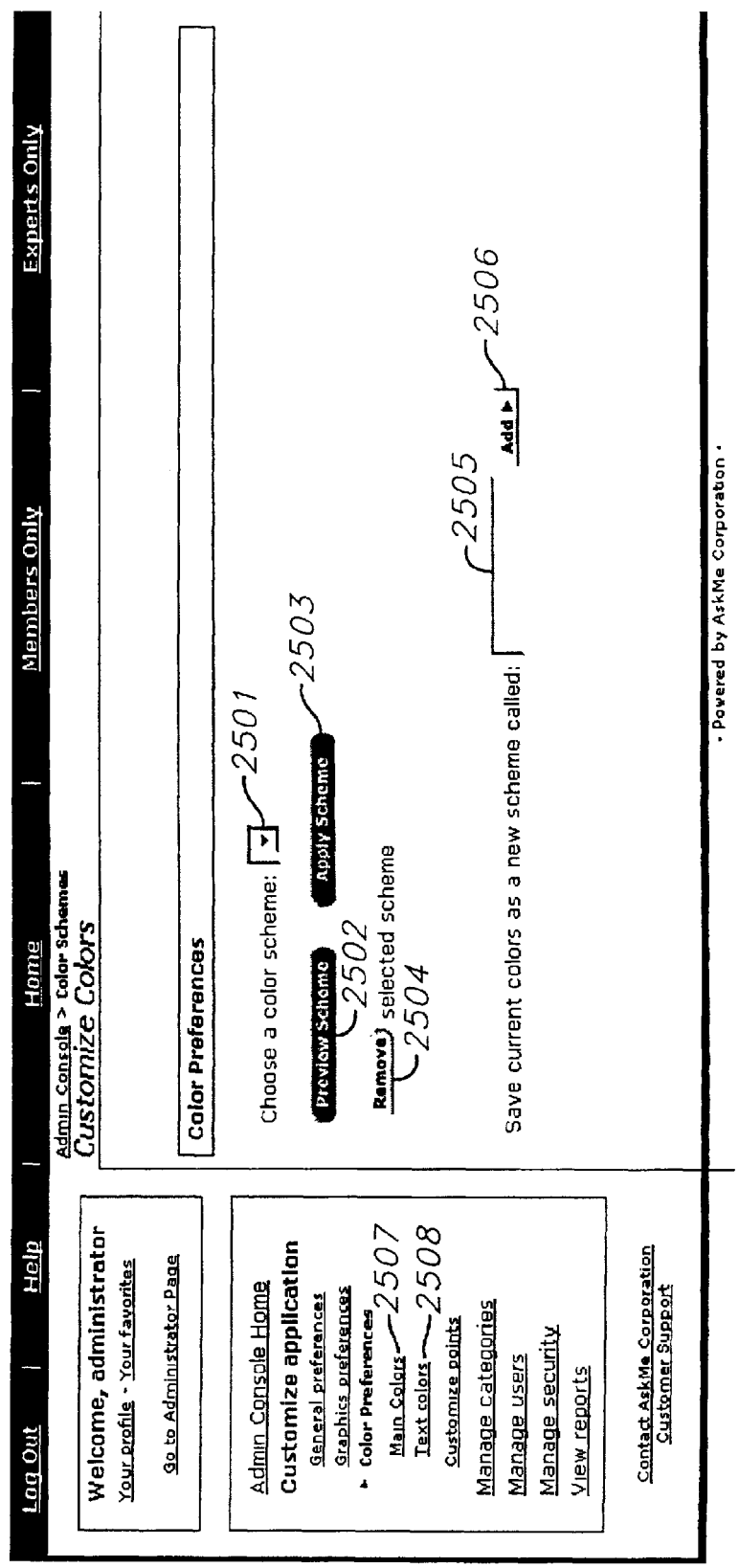
FIG. 25 is an example screen display of a Color Preferences component of the CM Administrative Console.

FIG. 25 is an example screen display of a Color Preferences component of the CM Administrative Console. Color schemes are used to assign standard colors to visual components throughout the user interface. The visual components to which colors may be assigned are the text, sidebar (e.g., an area down one side of a display screen), table banner (e.g., a banner containing title information displayed above tabular data), and border (e.g., a border displayed around each display screen). Color schemes are unique combinations of text colors, sidebar colors, table banner colors, and border colors. Super Administrators may choose between pre-set color schemes, or may create and store new color schemes. When the Choose Color Scheme drop-down 2501 is selected, the CM displays a list of stored color schemes for the SA to select from. When the Preview Scheme button 2502 is selected, the color scheme that is displayed in the Choose Color Scheme drop-down 2501 is temporarily applied to the current display screen so that the SA has an opportunity to test its effect. When the Apply Scheme button 2503 is selected, the CM stores the color scheme that is displayed in the Choose Color Scheme drop-down 2501 in the Administrative Settings segment 222 of the data repository 212 and applies the designated colors to all display screens throughout the user interface. When the Remove button 2504 is selected, the CM deletes the color scheme that is displayed in the Choose Color Scheme drop-down 2501 from the stored list of color schemes within the data repository. When a Color Scheme name is entered in the Name field 2505 and the Add button 2506 is selected, the CM stores the current color configuration as a new Color Scheme with the designated name in the data repository. This allows the SA to customize the colors of the user interface in any way the SA desires. When the Main Colors field 2507 is selected, the CM displays the Main Colors portion 2205 of the Color Preferences component 2204 of the Administrative Console 2201. When the Text Colors field 2508 is selected, the CM displays the Text Colors portion 2205 of the Color Preferences component 2204 of the Administrative Console 2201. The Main Colors portion 2205 and Text Colors portion 2206 are described further with reference to FIG. 26.

Figure 26:
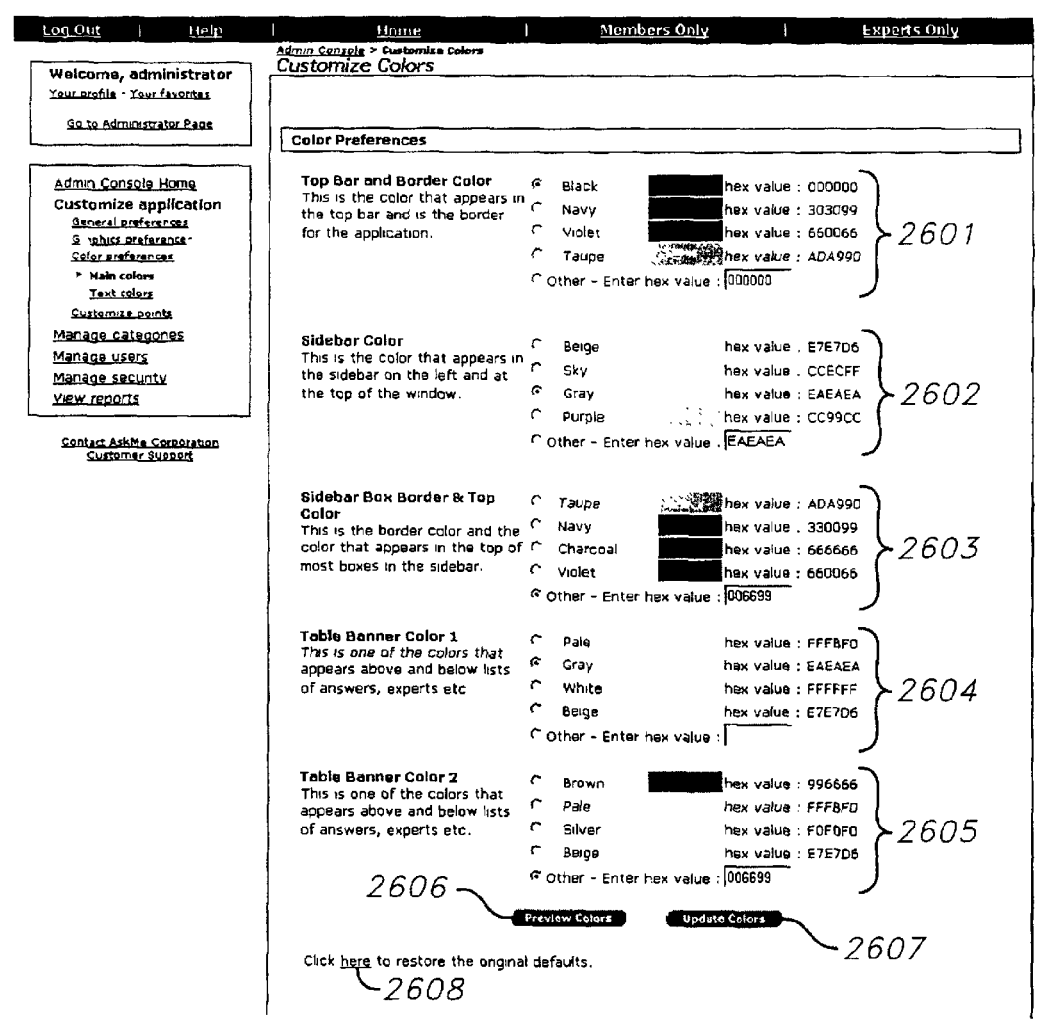

FIG. 26 is an example screen display of a Main Colors portion of the Color Preferences component of the CM Administrative Console. The Main Colors display screen includes sections that allow the SA to specify the Top Bar and Border Color 2601, the Sidebar Color 2602, the Sidebar Box Border and Top Color 2603, the Table Banner Color 1 2604, and the Table Banner Color 2 2605. When the Preview Colors button 2606 is selected, the CM temporarily applies the selected colors to the current display screen for testing purposes. When the Update Colors button 2607 is selected, the CM stores the selected colors within the currently selected color scheme, and applies the selected colors to all display screens within the user interface. When the Restore Defaults field 2608 is selected, the CM sets each color to the default color that was furnished with the system.

The Text Colors portion 2206 of the Color Preferences component of the Administrative Console operates in the same manner as the Main Colors portion 2205, described above. These colors affect the text within areas of the user interface. The colors that may be modified on the Text Colors display screen are the Top Bar Text, Site Text, Link Text, Sidebar Box Top Text, Category Text on Home Page, and Table Banner Color 2 Text.

FIG. 27 is an example screen display of a Customize Points component of the CM Administrative Console. Users and experts can earn "points" by performing various tasks within the system. For example, in a corporate environment, points may be implemented as an incentive to encourage employees to use the system. A reward system may be implemented allowing users and experts to redeem earned points for rewards (e.g., extra vacation days or corporate merchandise). The Customize Points component 2207 of the Administrative Console allows an SA to specify how many points are to be awarded for each task for a user and/or for an expert. The CM can award points to users for participating in conversations. The Rate Answer field 2701 stores the number of points awarded to a user when that user submits a rating for a received answer. The Ask Question field 2702 stores the number of points awarded to a user when that user asks a question that receives an answer. The CM also can award points to experts for participating in conversations. The Register Expert field 2703 stores the number of points awarded to an expert when that expert registers for the first time as an expert. The Answer Question field 2704 stores the number of points awarded to an expert when that expert answers a question that was directed to him or her. The Answer QB field 2705 stores the number of points awarded to an expert when that expert answers a question that was posted to a Question Board.

In addition to awarding points for general participation in conversations, the CM can award points for tasks that contribute to increasing the quality of the system. For example, the CM can award additional points to experts for quality answers. The "3" Rating field 2706 stores the number of points awarded to an expert when an answer that was submitted by that expert receives a rating of 3 (out of 5) from the user who asked the question. The "4" Rating field 2707 stores the number of points awarded to an expert when an answer that was submitted by that expert receives a rating of 4 (out of 5) from the user who asked the question. The "5" Rating field 2708 stores the number of points awarded to an expert when an answer that was submitted by that expert receives a rating of 5 (out of 5) from the user who asked the question. The "3 Up" Rating field 2709 stores the number of points awarded to an expert when an answer that was submitted by that expert receives a rating of 3 or better from a user other than the user who asked the question. The CM can also reward experts with points for quick response to user-submitted questions. The Hour field 2710 stores the number of points awarded to an expert for responding to a question within one hour. The Day field 2711 stores the number of points awarded to an expert for responding to a question within 24 hours. One skilled in the art will recognize that any scheme for rewarding points can be handled by the KMS, including schemes that define quality of answers differently (different point systems, or other designations of quality, such as descriptive words or text) or define timeliness on a different scale.

The SA can also indicate whether or not these points are displayed to the user or expert. When the Display Points and Ranking field 2712 is selected, the CM displays the users' points and ranking and top-ranked experts on various display screens within the User Console. When the Update button 2713 is selected, the CM stores the designated point values in the Administrative Settings segment 222 of the data repository 212. When the Defaults field 2714 is selected, the CM restores the original default values that are provided with the system.

Figure 28:
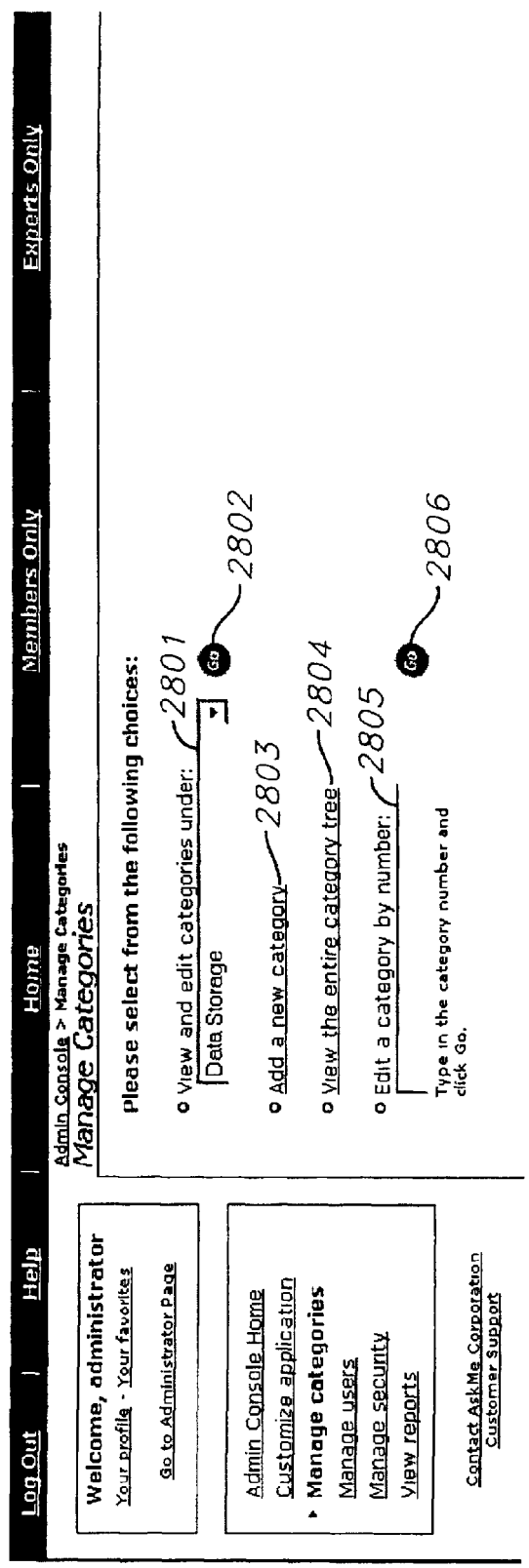
FIG. 28 is an example screen display of a Manage Categories component of the CM Administrative Console.

FIG. 28 is an example screen display of a Manage Categories component of the CM Administrative Console. With this screen, the CM allows Super Administrators and Category Administrators to manage the subject matter categories to define the topology of conversations. The administrators can edit the categories one by one, or as a whole topology. Specifically, when a subject matter category is selected from the Category List field 2801 (or specified in the Category Number field 2805) and the Go button 2802 (or 2806) is selected, the CM displays a screen allowing the system administrator to view and edit the details associated with the selected subject matter category. When the View Tree field 2804 is selected, the CM displays a hierarchical view of the subject matter categories, as described with reference to FIG. 30. When the Add Category field 2803 is selected, the CM displays the Add/Edit Category portion 2209 of the Manage Categories component 2208 of the Administrative Console.

Figure 29:
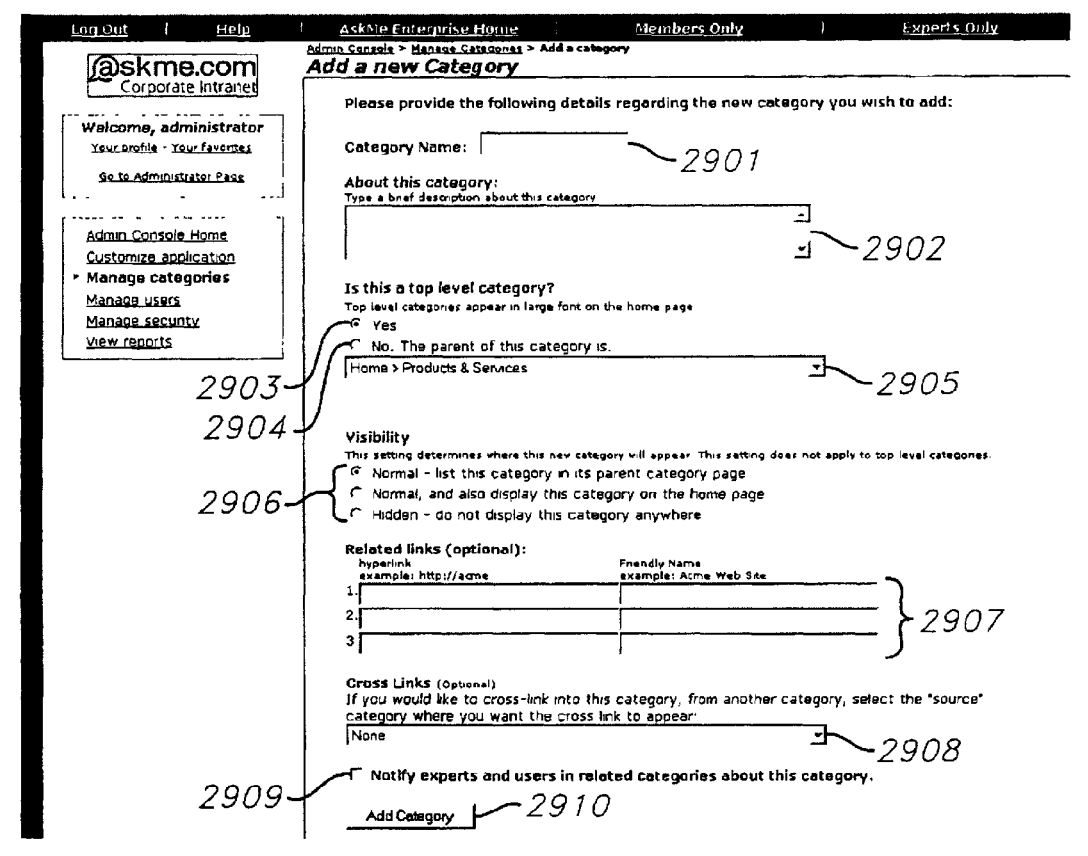

FIG. 29 is an example screen display of an Add/Edit Category portion of the Manage Categories component of the CM Administrative Console. The Category Name field 2901 stores the name assigned to the subject matter category. The Description field 2902 stores a textual description of the subject matter category. The subject matter category being added will be either a top-level category or a subcategory. When the Top Level field 2903 is selected, the CM will display the new subject matter category from the Initiate Session display screen. When the Subcategory field 2904 is selected, the Parent field 2905 must also be populated. The Parent field 2905 specifies the subject matter category that is the direct parent (ancestor) of the new subject matter category that is being added. When a new subject matter category is designated as a subcategory, there are three Visibility options 2906. The new subject matter category may be visible from within the parent subject matter category, the new subject matter category may be visible from within the parent subject matter category and the Initiate Session display screen, or the new subject matter category may be hidden, in which case it is not accessible within the system. Each subject matter category may have related hyperlinks that the CM displays on the subject matter category display screen. For example, in a corporate environment, a link to the website for the insurance company that provides the employer sponsored health insurance may be associated with the "Human Resources—Benefits" category and subcategory. These hyperlinks and each link's associated selectable text are specified in the Related Links area 2907. Optionally, the Cross Links field 2908 stores another subject matter category from which the new subject matter category may be accessed. When the Notify field 2909 is selected, the CM sends an email notification of the new subject matter category to all users and experts in subject matter categories that are related to the new subject matter category. When the Add Category button 2910 is selected, the CM stores the new subject matter category in the Subject Matter Category Index 215 segment of the data repository 212.

When an administrator desires to edit an existing category or subcategory, a similar screen display is displayed with the various fields prepopulated. The administrator is then able to edit them and save the changes.

Figure 30:
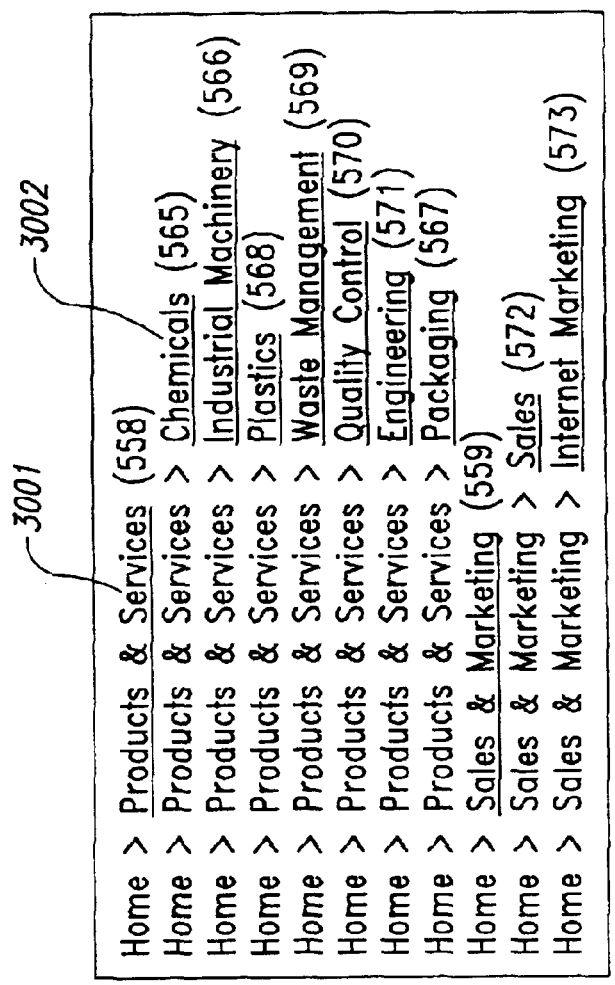
FIG. 30 is an example display of a Subject Matter Category Tree.

FIG. 30 is an example display of a Subject Matter Category Tree. The category tree shows the relationships between all subject matter categories by listing each category and its subcategories in a succinct manner. When a Category 3001 or Subcategory 3002 is selected, the CM displays the Edit Category display screen with all fields pre-populated with the data associated with the selected subject matter category.

Figure 31:
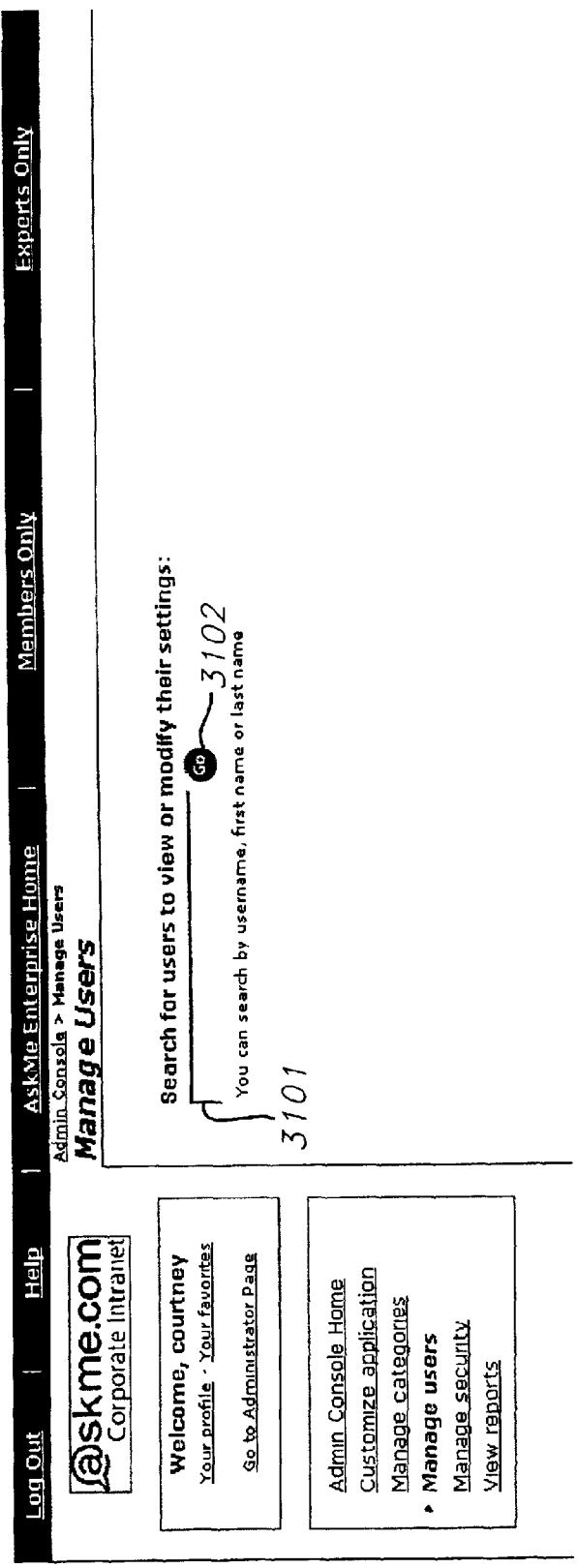
FIG. 31 is an example display screen of a Search Users portion of the Manage Users component of the CM Administrative Console.
Figure 32:
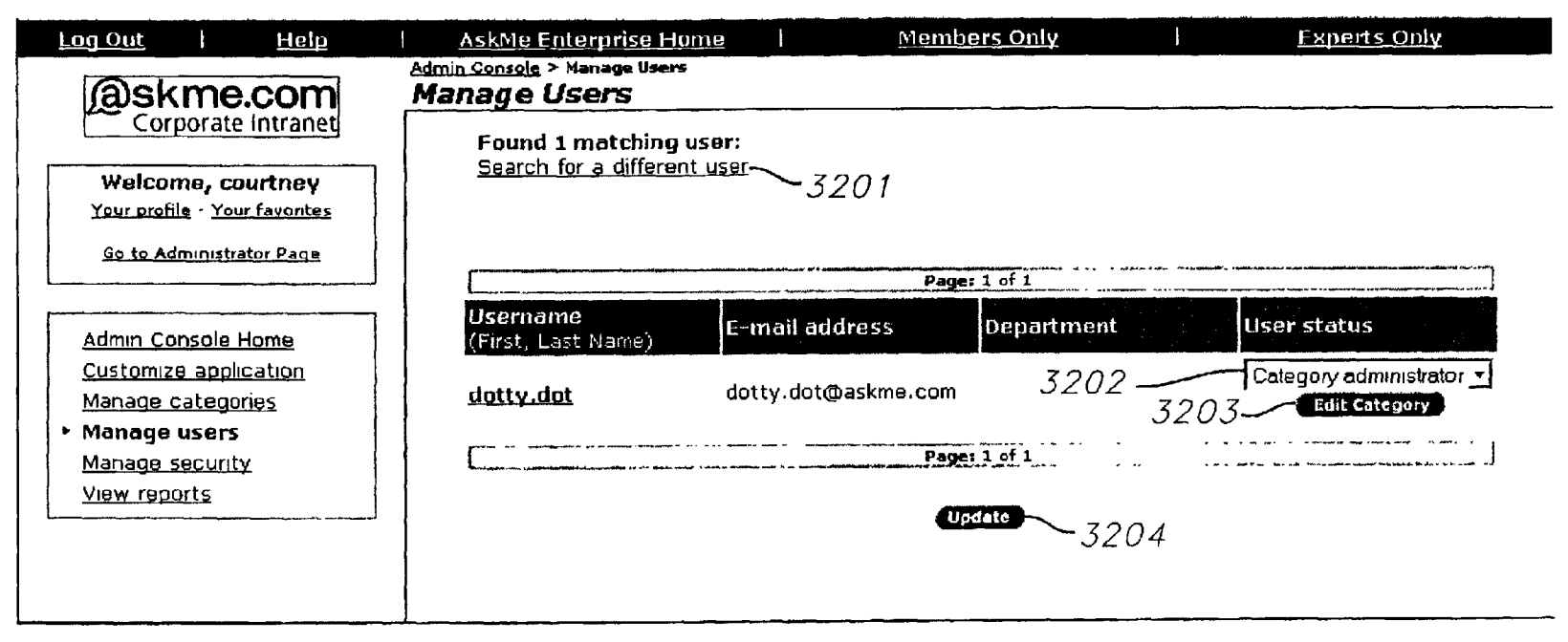
Figure 33:
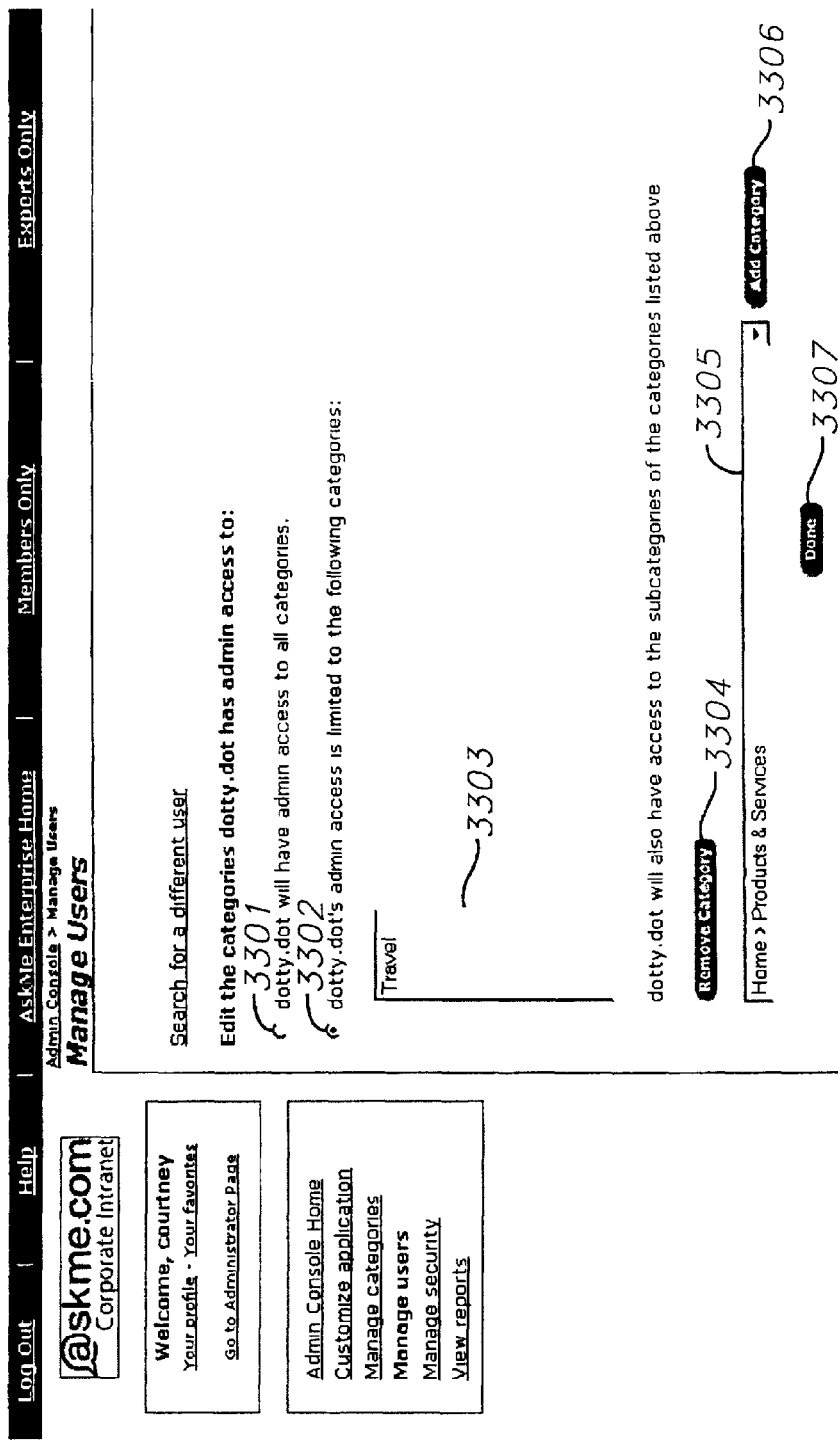
FIG. 33 is an example screen display of an Edit Users portion of the Manage Users component of the CM Administrative Console.

FIGS. 31–33 are example screen displays of three portions that comprise a Manage Users component of the CM Administrative Console. These portions include a Search Users 2212, a Select Users 2213, and an Edit Users 2214 portions.

FIG. 31 is an example screen display of a Search Users portion of the Manage Users component of the CM Administrative Console. When text is entered in the Text field 3101 and the Go button 3102 is selected, the CM performs a text search, comparing the text that was entered with the usernames, first names, and last names of all users to locate one or more registered users that match the designated search text. The CM then displays the Select Users portion 2213 of the Manage Users component 2211 of the Administrative Console.

FIG. 32 is an example screen display of a Select Users portion of the Manage Users component of the CM Administrative Console. The Select Users portion 2213 is used to select a registered user from the displayed list of registered users that match the search criteria submitted on the previous screen. When the Search Again field 3201 is selected, the CM displays the Search Users display screen described above in reference to FIG. 31, allowing the administrator to perform another search. The Category field 3202 stores a designator indicating the administration level that has been assigned to the user (Category Administrator, Super Administrator, or None). When the Edit Category button 3203 is selected, the CM displays the Edit Users screen display, discussed below with reference to FIG. 33. When the Update button 3204 is selected, the CM stores all modified user information in the data repository.

FIG. 33 is an example screen display of an Edit Users portion of the Manage Users component of the CM Administrative Console. The Edit Users portion 2214 is used to grant access rights to a user. When the All Categories field 3301 is selected, the CM will recognize the user as a Category Administrator in all subject matter categories. When the Limited Categories field 3302 is selected, the CM will recognize the user as a Category Administrator in the subject matter categories listed in the Category List field 3303. When a subject matter category in the Category List field 3303 is selected and the Remove Category button 3304 is selected, the selected subject matter category will be removed from the list of categories for which the user is a Category Administrator. When a subject matter category is selected from the All Categories List field 3305 and the Add Category button 3306 is selected, the CM adds the selected subject matter category to the Category List field 3303. When the Done button 3307 is selected, the CM stores the modified access rights data in the data repository and displays the Select Users screen display described above with reference to FIG. 32.

Figure 34:
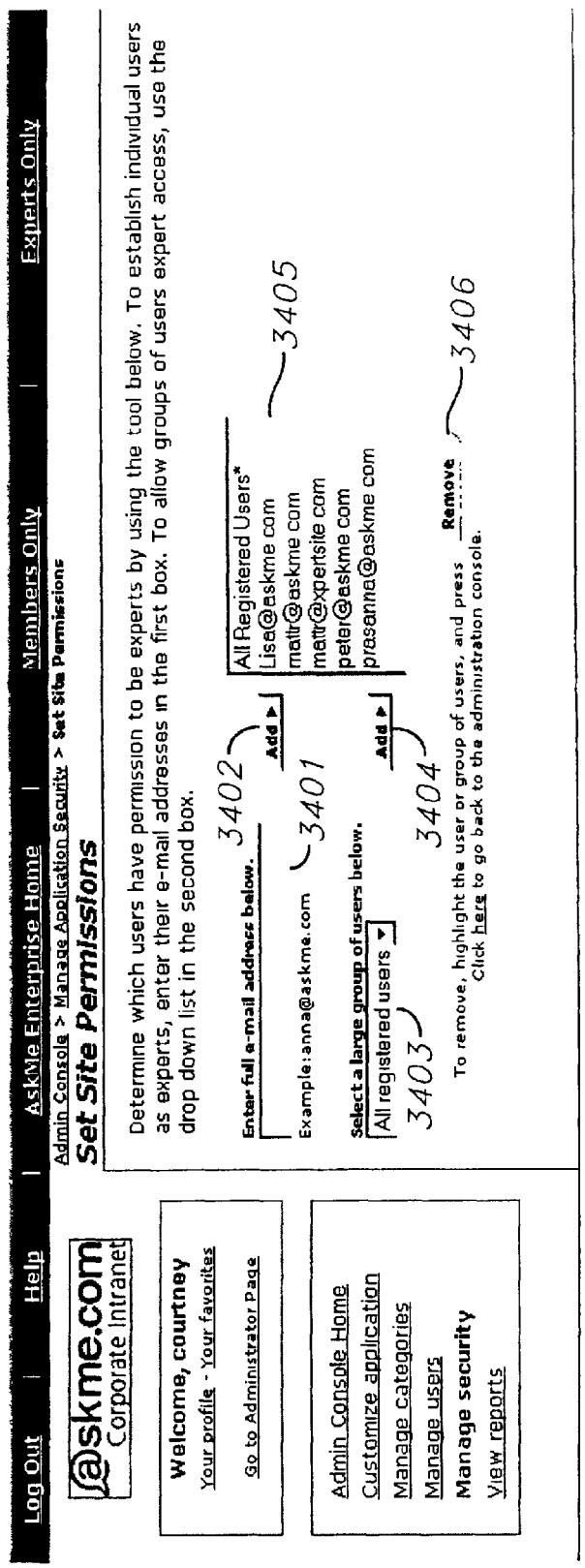
FIG. 34 is an example screen display of a Set Site Permissions component of the CM Administrative Console.

FIG. 34 is an example screen display of a Set Site Permissions component of the CM Administrative Console. This component allows an SA to assign specific users access to become experts. When a user's email address is entered in the User field 3401 and the Add User button 3402 is selected, the specified user is added to the Potential Expert list 3405. When a user group is selected from the User Group field 3403 and the Add Group button 3404 is selected, the selected group of users is added to the Potential Expert list 3405. When a specific user or user group is selected in the Potential Expert list 3405 and the Remove button 3406 is selected, the CM prohibits the selected user or group of users from registering as experts within the system.

Figure 35:
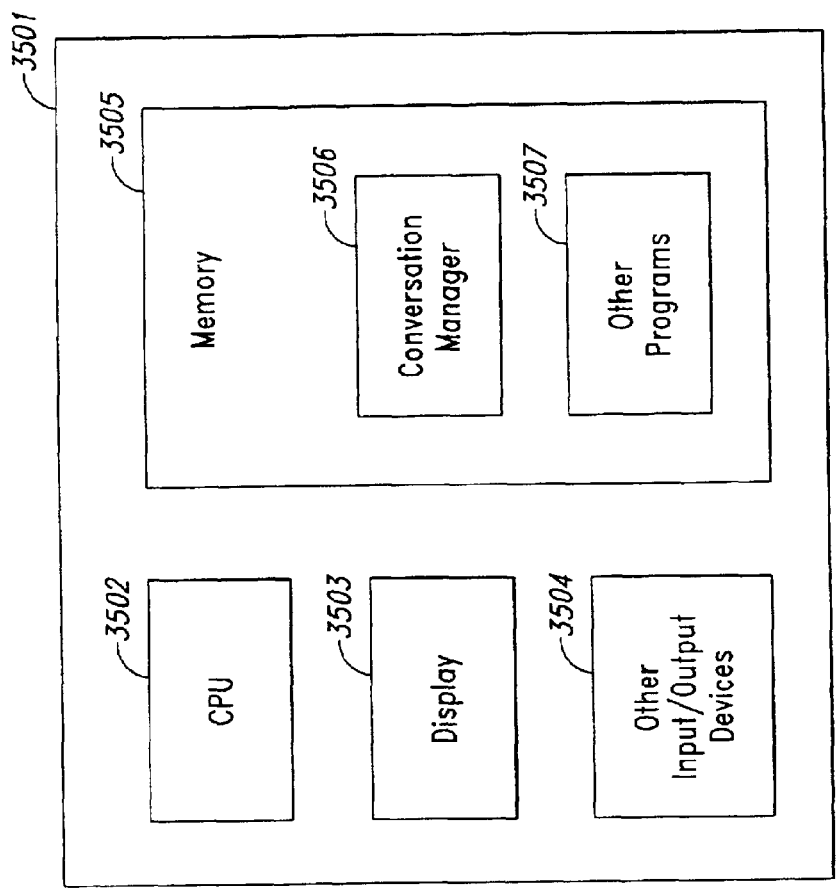
FIG. 35 is a block diagram of a general purpose computer system for practicing embodiments of the Conversation Manager.

FIG. 35 is a block diagram of a general purpose computer system for practicing embodiments of the Conversation Manager. The computer system 3501 contains a central processing unit (CPU) 3502, a display 3503, a computer memory (memory) 3505, or other computer-readable memory medium, and other input/output devices 3504, such as network connections or other communications medium. The components of the CM 3506 typically reside in the memory 3505 and execute on the CPU 3502. As described with respect to FIG. 1, the CM comprises several components, including, for example, user interface components 103, user services 104, general services 105, administrative services 108, and a data repository with Subject Matter Category Index 102, which are shown residing in the memory 3505. Other programs 3507 may also reside in the memory 3505.

One skilled in the art will recognize that exemplary Conversation Managers can be implemented as one or more code modules and may be implemented in a distributed environment where the various programs shown as currently residing in the memory 3505 are instead distributed among several computer systems. In addition, a computer system may itself be distributed. For example, referring to FIG. 1, the data repository 102 may reside on a server computer system and execute separately from the CM user interface components 103. Similarly, each or combinations of the various components of the user interface may reside on different computer systems. In addition, the database may be distributed across several computer systems and different types of memories. One skilled in the art will also recognize that storing and retrieving data to and from the data repository may be implemented using any database technique or other method of storage and retrieval. Other system variations and configurations are also contemplated without affecting the scope of the present invention.

Figure 36:
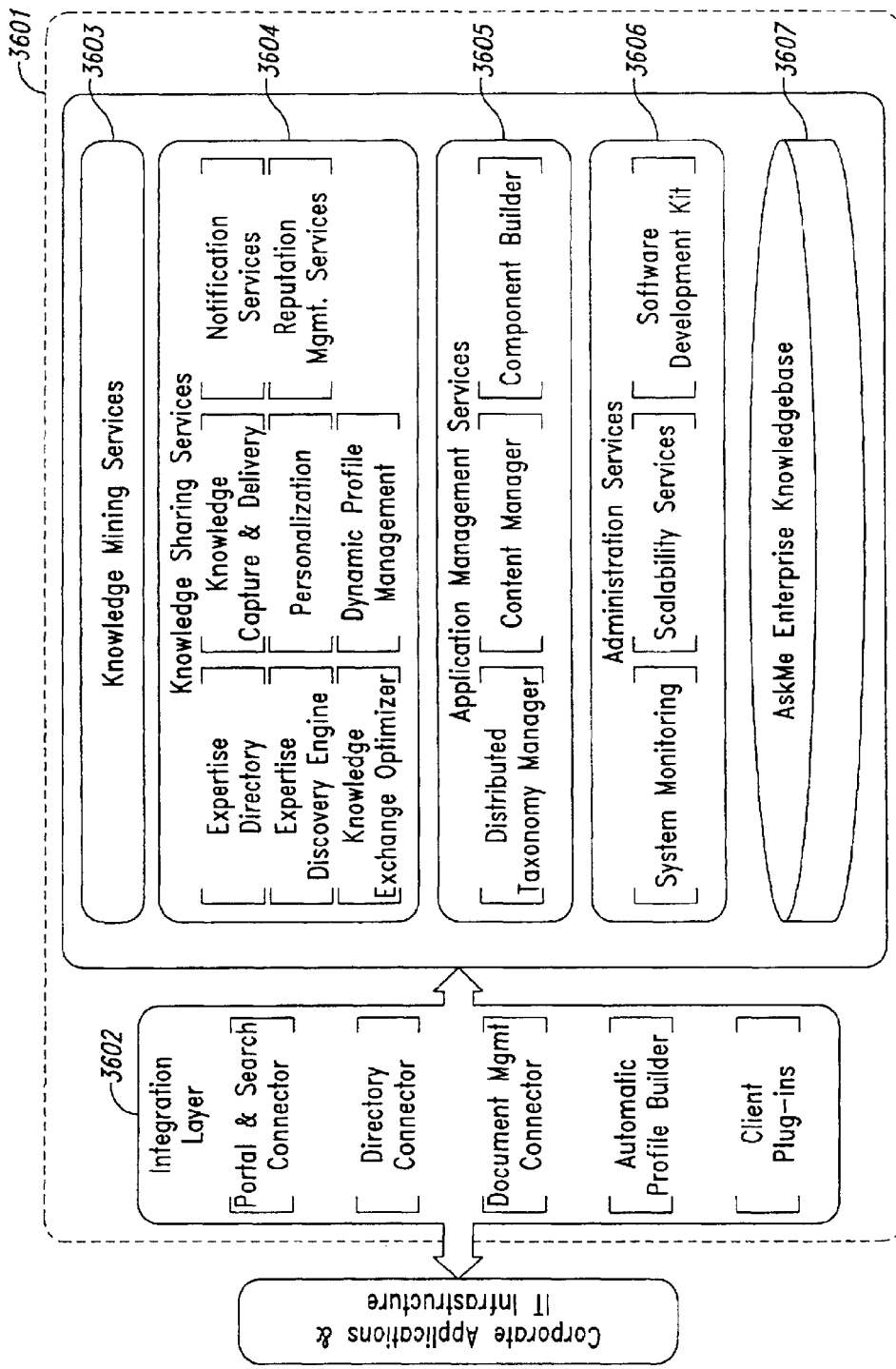
FIG. 36 is a block diagram of an example implementation in a corporate environment of an Enhanced Knowledge Management System that includes a Conversation Manager.

FIG. 36 is a block diagram of an example implementation in a corporate environment of an Enhanced Knowledge Management System that includes a Conversation Manager. The KMS 3601 shown here includes an Integration Layer 3602, Knowledge Mining Services 3603, Knowledge Sharing Services 3604, Application Management Services 3605, Administration Services 3606, and the Enterprise Knowledgebase 3607. Portions of multiple of these modules constitute what has been described herein as the Conversation Manager. The Integration Layer 3602 provides access to existing corporate databases, such as through the LDAP interface discussed earlier. With reference to FIG. 1, the Knowledge Sharing Services 3604, Application Management Services 3605, Administration Services 3606 interrelate and communicate to implement the user interface 103, user services 104, general services 105, and administrative services 108. FIGS. 37 through 40 provide example descriptions of sample embodiments of several routines that are implemented by these components of the Conversation Manager to accomplish the functions of the enhanced KMS. One skilled in the art will recognize that other routines are also present and not described herein. Also, that the specific steps and ordering of the steps of these routines can be changed without affecting the scope of the present invention and are specifically contemplated.

Figure 37A:
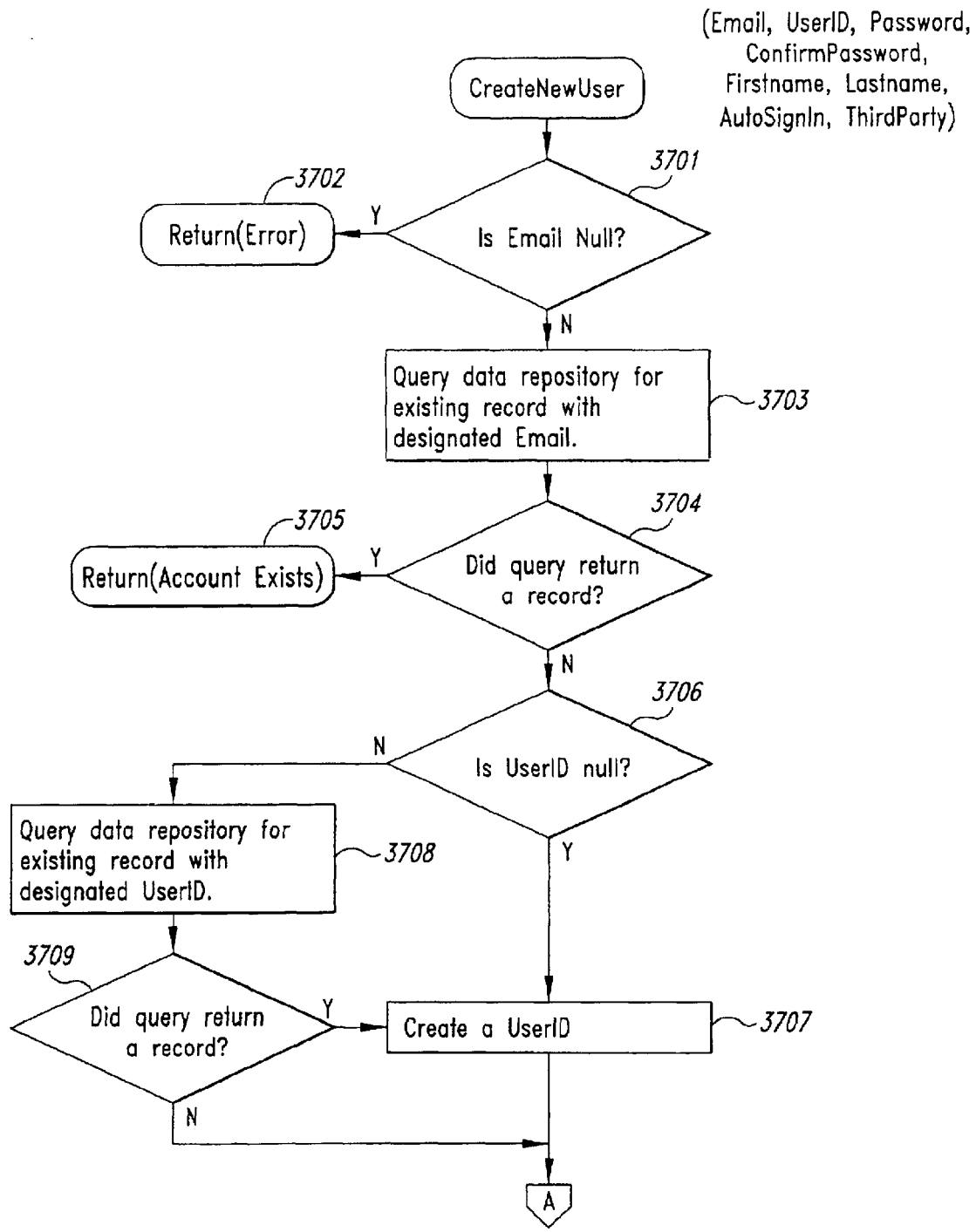
FIG. 37 is an example flow diagram of the steps performed by a CreateNewUser routine of the general services component of an example Conversation Manager.
Figure 37B:
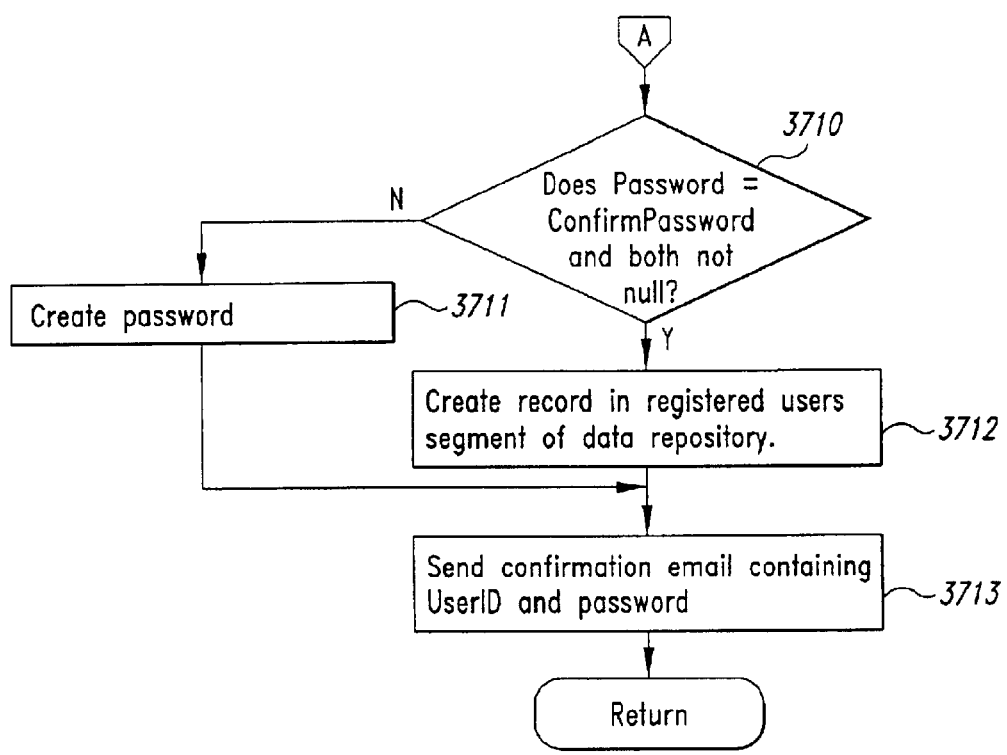

FIG. 37 is an example flow diagram of the steps performed by a CreateNewUser routine of the general services component of an example Conversation Manager. The CreateNewUser routine is used to store the data necessary to register a new user. In summary, the CreateNewUser routine verifies that the required data was received and is valid, and stores the data in the data repository. The CreateNewUser routine receives as input an email address, a UserID, a password, a confirmed password, a first name, a last name, an "auto sign in" indicator, and a "third party" indicator. Specifically, in step 3701, the routine examines the designated email address to determine whether or not it contains a value. An email address is required for each user account, so if the designated email address is null, the routine progresses to step 3702, where it returns an error code indicating that an email address was not received. If the designated email address is not null, the routine progresses to step 3703, in which the routine queries the Registered Users segment 213 of the data repository 212 for any records with the designated email address. In step 3704, the routine examines the results of the query to determine whether or not any records were returned. If a record was returned, then the routine continues in step 3705, else it continues in step 3706. In step 3705, the routine returns an error code indicating that a user account already exists with the designated email address. In step 3706, the designated UserID is examined to determine whether or not it contains a value. If the designated UserID is null, the routine continues in step 3707 where a new UserID is created; otherwise, the routine continues in step 3708. In step 3708, the routine queries the Registered Users segment 213 of the data repository 212 for any records with the designated UserID. In step 3709, the routine examines the results of the query, and, if a record is found, continues in step 3707, else continues in step 3710. In step 3710 the routine examines the designated Password and ConfirmPassword input parameters to verify that they both contain a value and that the values are identical. If either value is null or the two values are not identical, the routine continues in step 3711, where a new password is created, else the routine continues in step 3712. In step 3712, the routine stores the data in the Registered Users segment 213 of the data repository 212. In step 3713, the routine creates and sends an email confirmation message containing the assigned UserID and password to the designated email address.

Figure 38:
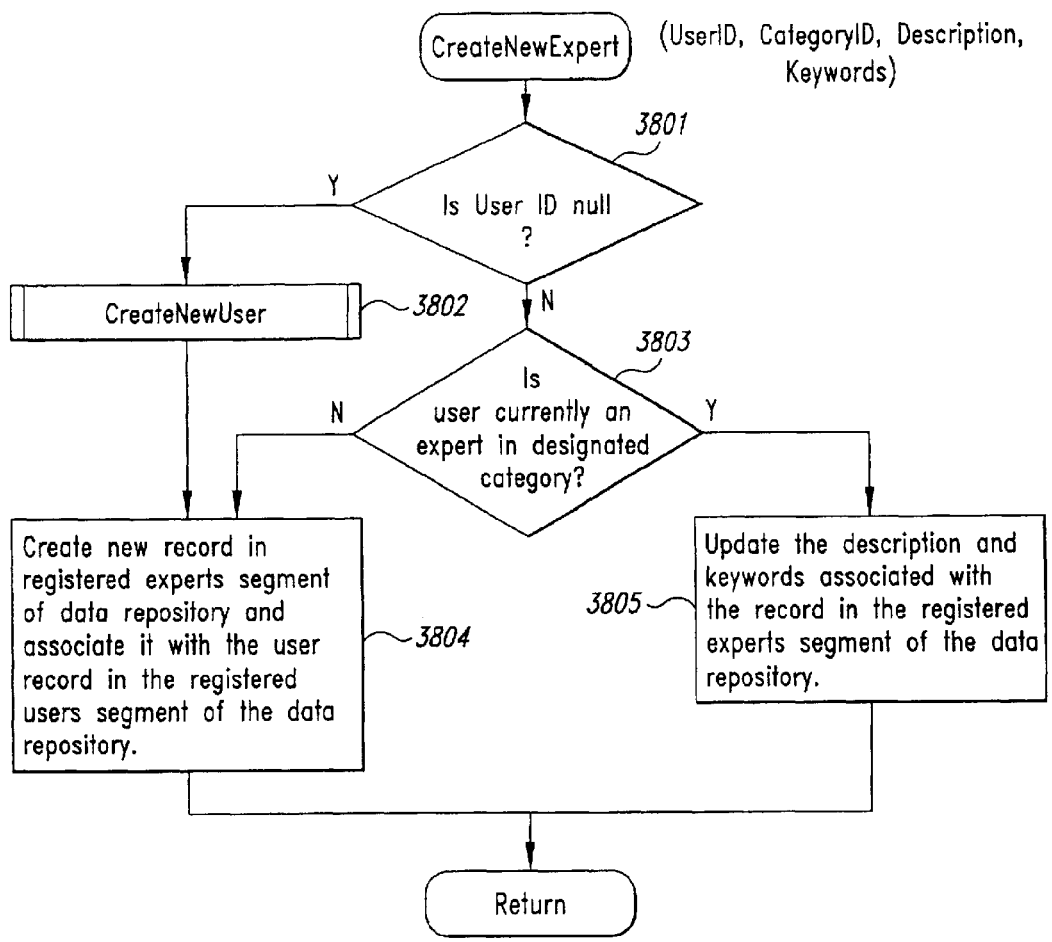
FIG. 38 is an example flow diagram of the steps performed by a CreateNewExpert routine of the general services component of an example Conversation Manager.

FIG. 38 is an example flow diagram of the steps performed by a CreateNewExpert routine of the general services component of an example Conversation Manager. The CreateNewExpert routine is used to store the data necessary to register a new expert. In summary, the CreateNewExpert routine verifies that the required data was received and is valid, and stores the data in the data repository. The CreateNewExpert routine receives as input a UserID, a CategoryID, an Expertise Description, and a Keywords List. Specifically, in step 3801, the routine examines the designated UserID to determine whether or not it contains a value. If the designated UserID is null, the routine continues in step 3802, otherwise it continues in step 3803. In step 3802, the routine calls the CreateNewUser routine described above with reference to FIG. 37, and continues in step 3804. In step 3804, the routine creates a new record in the Registered Experts segment 214 of the data repository 212 and associates that record with the user record in the Registered Users segment 213 of the data repository 212, and returns. In step 3803, when the designated UserID contains a value, the routine queries the data repository 212 to determine whether or not the expert is already registered in the designated subject matter category. If so, the routine continues in step 3805, else the routine continues in step 3804 to create a new record. In step 3805, the routine updates the expert's Expertise Description and Keywords List for the designated subject matter category in the Registered Experts segment 214 of the data repository 212, and returns.

Figure 39:
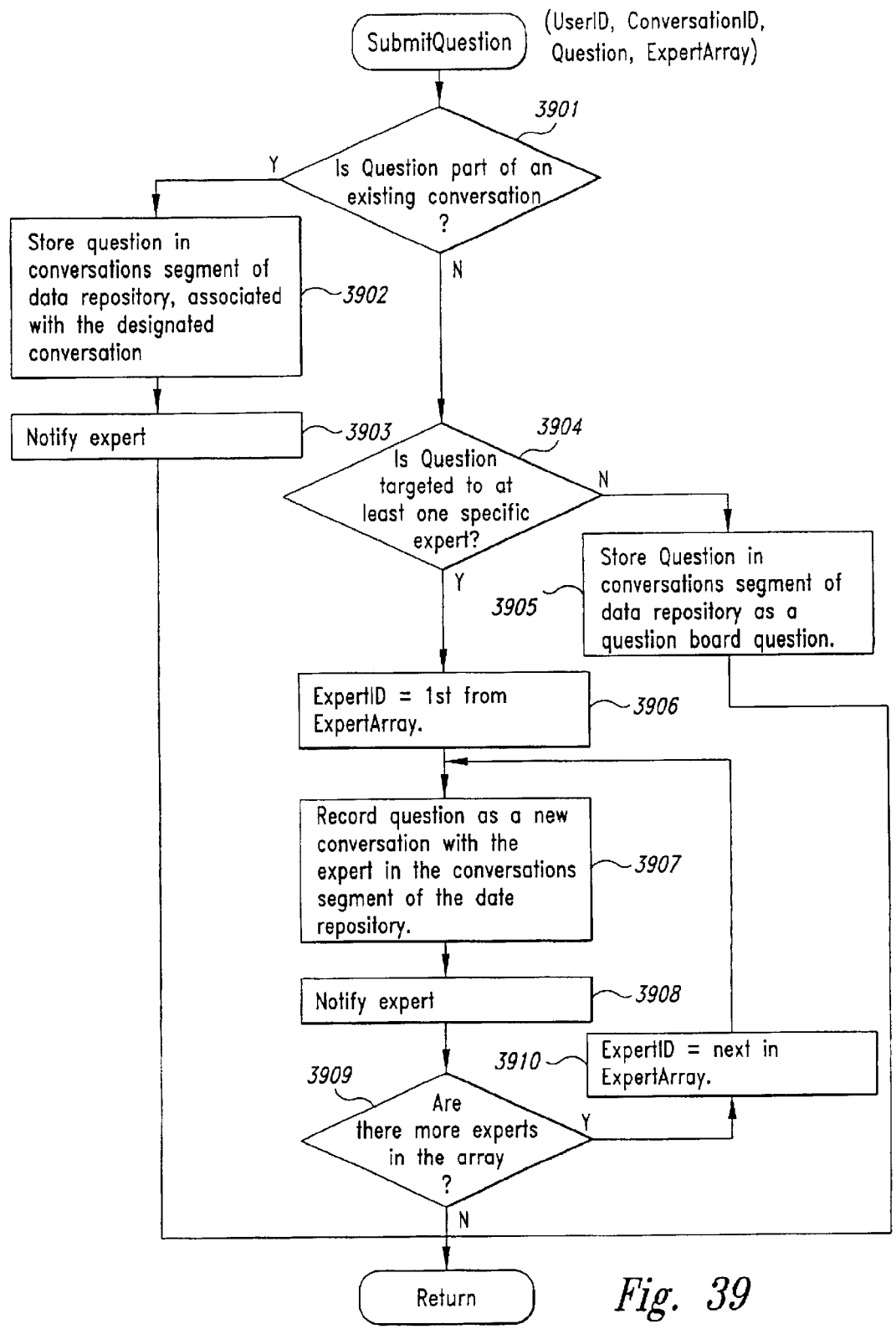
FIG. 39 is an example flow diagram of the steps performed by a SubmitQuestion routine of the user services component of an example Conversation Manager.
Figure 40:
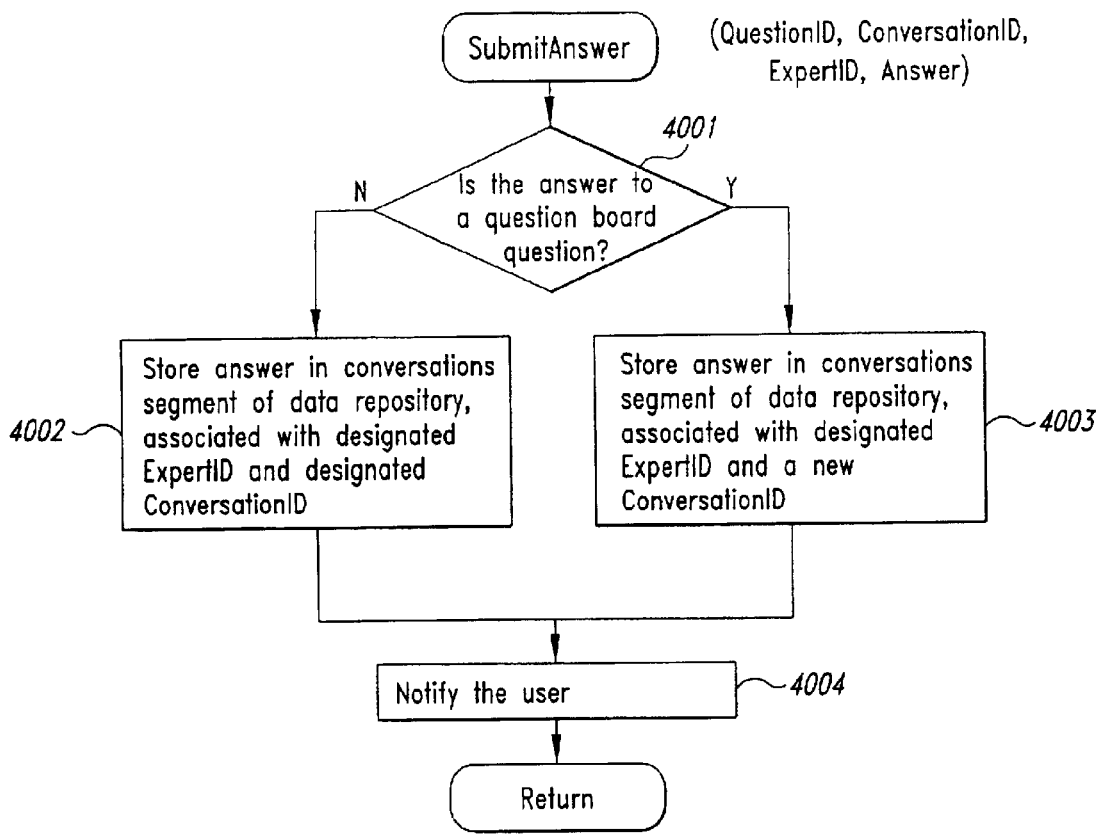
FIG. 40 is an example flow diagram of the steps performed by a SubmitAnswer routine of the user services component of an example Conversation Manager.

FIGS. 39 and 40 are example embodiments of the user services within the Conversation Manager that are available to all registered users of the system.

FIG. 39 is an example flow diagram of the steps performed by a SubmitQuestion routine of the user services component of an example Conversation Manager. The SubmitQuestion routine is used to store data that is entered when a user submits a new question (e.g., step 305 in FIG. 3). In summary, the SubmitQuestion routine examines the data that was received, determines how it needs to be stored in the data repository, and stores the data. The SubmitQuestion routine receives as input parameters, a UserID, a ConversationID, a Question, and an Expert Array. Specifically, in step 3901, the routine determines whether or not the question being submitted is part of an existing conversation (a follow-up question). If the question is part of an existing conversation, then the routine continues in step 3902, else continues in step 3904. In step 3902, the question in stored in the Conversations Segment 216 of the data repository 212 as part of the existing conversation, and the routine continues in step 3903. In step 3903, the routine sends notification of the new question to the designated expert, and returns. If in step 3901 the routine determines that the question is not part of an existing conversation, then in step 3904, the routine determines whether or not there is at least one specific expert designated in the Expert Array (which indicates experts to whom to submit the question). If there are no specific experts designated, then routine continues in step 3905, else continues in step 3906. In step 3905, the routine stores the question in the Conversations Segment 216 of the data repository 212 as a Question Board question, and returns. In steps 3906 through 3910, the routine loops for each designated expert in the Expert Array to store appropriate information and to notify each designated expert of the pending question. In particular in step 3906, the ExpertID is set to the first expert in the designated Expert Array. In step 3907, the question is recorded in the Conversations Segment 216 of the data repository 212 as a first question in a new conversation associated with the expert identified by the ExpertID of the first expert in the Expert Array. In step 3908, the routine sends notification of the question to the expert. In step 3909, the routine determines whether or not there are more experts specified in the designated Expert Array, and if so, continues in step 3910, else returns. In step 3910, the routine sets the current ExpertID to the ExpertID of the next expert in the designated Expert Array and then loops back to step 3907.

FIG. 40 is an example flow diagram of the steps performed by a SubmitAnswer routine of the user services component of an example Conversation Manager. The SubmitAnswer routine is used to store data that is entered when an expert submits a response to a question. In summary, the SubmitAnswer routine examines the data that was received, determines how it needs to store the data in the data repository, and stores the data. The SubmitAnswer routine receives as input parameters a QuestionID, a ConversationID, an ExpertID, and an Answer. Specifically, in step 4001, the routine determines whether or not the answer is in response to a Question Board question, and, if so, continues in step 4003, else continues in step 4002. In step 4002, when the answer is not in response to a Question Board question, the routine stores sufficient information to associate the answer with the pending conversation, i.e., the routine stores the answer in the Conversations Segment 216 of the data repository 212, associates it with the designated ExpertID and ConversationID, and continues in step 4004. In step 4003, when the answer is in response to a Question Board question, the routine stores sufficient information to identify the response with the question and the particular expert who chose to answer it, i.e., the routine stores the answer in the Conversations Segment 216 of the data repository 212, assigns the answer a new ConversationID, and associates it with the designated QuestionID and ExpertID. In step 4004, the routine sends notification to the requestor (user) of the answer, and returns.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to public knowledge management systems implemented via a network, for example, the Internet or specialized knowledge management systems implemented within the infrastructure of a large corporation, small business, or any other organization of persons and/or resources. In addition, the teachings may be applied to other types of systems, including turnkey systems and conversation management systems embedded in other devices, including both hardware and software devices. These and other changes may be made to the invention in light of the above detailed description. Accordingly, the invention is not limited by the disclosure, but instead the scope of the present invention is to be determined by the following claims.

What is claimed is:

1. A method in a computer system for dynamically generating a distributed knowledge base that is integrated with existing data, comprising:

receiving indications of data elements from the existing data and storing references to the indicated data elements;

using the stored references to the indicated data elements of existing data to register a plurality of users and experts;

receiving a request from one of the registered users to submit a question;

determining an expert to answer the question from the registered experts;

forwarding the question to the determined expert;

receiving an indication of an answer from the determined expert; and storing the indicated answer with the submitted question so that users other than the user from whom the request was received can access the question and indicated answer.

2. A method in a computer system for managing categorized communication between a requestor and an expert resource using a person-to-person knowledge sharing portal, comprising:

displaying a list of categories;

determining a selected category from the displayed list of categories;

displaying a list of expert resources associated with the selected category, each expert resource having a rank, the displayed list of expert resources ordered by the ranks;

determining an indication of an expert resource from the displayed list of expert resources;

determining an indication of a question related to the selected category;

forwarding the indicated question to the indicated expert resource;

receiving an answer related to the indicated question;

displaying the received answer in conjunction with the indicated question;

determining an indication of a rating associated with the displayed answer; and using the received rating indication, re-determining the rank associated with the indicated expert resource.

3. A computer-readable memory medium containing instructions for controlling a computer processor to manage categorized communication between a requestor and an expert resource using a person-to-person knowledge sharing portal, by:

displaying a list of categories;

determining a selected category from the displayed list of categories;

displaying a list of expert resources associated with the selected category, each expert resource having a rank, the displayed list of expert resources ordered by the ranks;

determining an indication of an expert resource from the displayed list of expert resources;

determining an indication of a question related to the selected category;

forwarding the indicated question to the indicated expert resource;

receiving an answer related to the indicated question;

displaying the received answer in conjunction with the indicated question;

determining an indication of a rating associated with the displayed answer; and using the received rating indication, re-determining the rank associated with the indicated expert resource.

4. A method in a computer system for providing a private exchange of information between a user and an expert resource, comprising:

receiving a question from the user and directed to the expert resource;

forwarding the question only to the expert resource;

receiving an answer to the question from the expert resource;

receiving an answer rating associated with the received answer;

associating the answer rating with the received answer; and providing for display to only the user and the expert resource, the received answer in conjunction with the received question and the rating, thereby prohibiting display of the received question, the received answer, and the received rating to anyone other than the user and the expert resource.

5. The method of claim 4 wherein the expert resource has an associated determined expert rank, and further comprising using the received answer rating to re-determine the expert rank associated with the expert resource.

6. The method of claim 4 wherein the expert resource can mute a user.

7. A method in a computer system for providing rated responses to questions on a question board, comprising:

receiving a question;

displaying the received question;

receiving from an expert resource a response that relates to the displayed question;

displaying the received response in conjunction with the received question;

receiving a rating of the received response; and indicating the rating in conjunction with the displayed response.

8. The method of claim 7 wherein the source of the rating of the received response is the same as the source of the received question.

9. The method of claim 7 wherein the source of the rating of the received response is different than the source of the received question.

10. The method of claim 7 wherein the received rating is combined with another rating of the response and the rating that is indicated in conjunction with the displayed response is a combined rating.

11. The method of claim 7 wherein the displaying of the received question comprises:

receiving an expiration condition; and only when the expiration condition has not been met, displaying the question in conjunction with any received response.

12. The method of claim 11 wherein the expiration condition indicates a period of time.

13. The method of claim 11 wherein the expiration condition indicates a number of received responses.

14. The method of claim 7 further comprising:

receiving an indicator identifying an expert resource to be muted; and prohibiting the identified expert resource from submitting a response to the submitted question.

15. A question board in a computer system having a display facility, comprising:

expert resource; and question resolution engine structured so that, in response to receiving a question, the engine forwards the received question to the expert resource;

upon receiving a response from the expert resource that relates to the forwarded question, displays the response on the display facility; and upon receiving a rating of the response, indicates the rating in conjunction with the displayed response.

16. The question board of claim 15 wherein the question resolution engine displays the received question on the display facility.

17. The question board claim 15 wherein the source of the rating of the received response is the same as the source of the received question.

18. The question board of claim 15 wherein the source of the rating of the received response is different than the source of the received question.

19. The question board of claim 15 wherein the received rating is combined with another rating for the response and a combined rating is indicated in conjunction with the displayed response.

20. The question board of claim 15 wherein the question resolution engine is further structured to:

receive an expiration condition; and only when the expiration condition has not been met, display the received question in conjunction with any received response.

21. The question board of claim 20 wherein the expiration condition indicates a period of time.

22. The question board of claim 20 wherein the expiration condition indicates a number of received responses.

23. The question board of claim 15 wherein the question resolution engine is further structured to: of pending questions associated with the knowledge resource, a number of responses submitted by the knowledge resource, and response times associated with the knowledge resource.

* * * * *

UNITED STATES PATENT AND TRADEMARK OFFICE
CERTIFICATE OF CORRECTION

PATENT NO. : 6,901,394 B2  Page 1 of 1
DATED : May 31, 2005
INVENTOR(S) : Digvijay S. Chauhan et al.

It is certified that error appears in the above-identified patent and that said Letters Patent is hereby corrected as shown below:

Column 28,
Lines 44-47, "to: of pending questions associated with the knowledge resource, a number of responses submitted by the knowledge resource, and response times associated with the knowledge resource." should read as -- to: receive an indicator identifying an expert resource to be muted; and prohibit display of a response received from the identified expert resource. --.

Signed and Sealed this

Sixth Day of June, 2006

JON W. DUDAS
*Director of the United States Patent and Trademark Office*